United States Patent
Yoneyama et al.

(10) Patent No.: US 6,980,359 B2
(45) Date of Patent: Dec. 27, 2005

(54) MICROSCOPE SYSTEM

(75) Inventors: Takashi Yoneyama, Sagamihara (JP); Nobuaki Sakai, Hachioji (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 10/794,163

(22) Filed: Mar. 4, 2004

(65) Prior Publication Data

US 2004/0169915 A1 Sep. 2, 2004

Related U.S. Application Data

(63) Continuation of application No. 10/094,722, filed on Mar. 11, 2002, now abandoned.

(30) Foreign Application Priority Data

Mar. 12, 2001 (JP) ........................................ 2001-069121

(51) Int. Cl.[7] .............................................. G02B 21/00
(52) U.S. Cl. ....................... 359/379; 359/368; 359/382
(58) Field of Search ............................... 359/368, 379, 359/383, 382, 391, 392, 823; 250/201.2, 201.3, 201.4

(56) References Cited

U.S. PATENT DOCUMENTS 5,783,814 A 7/1998 Fairley et al. ........... 250/201.3
6,043,475 A 3/2000 Shimada et al. ......... 250/201.3
6,507,433 B2 1/2003 Mecham et al. ............ 359/379
6,628,459 B2 * 9/2003 Ue .............................. 359/392

FOREIGN PATENT DOCUMENTS

| JP | 05-026612 A | 2/1993 |
| JP | 08-129136 A | 5/1996 |
| JP | 10-260361 A | 9/1998 |
| JP | 2000-199858 A | 7/2000 |

* cited by examiner

*Primary Examiner*—Thong Nguyen
*Assistant Examiner*—Arnel C. Lavarias
(74) *Attorney, Agent, or Firm*—Frishauf, Holtz, Goodman & Chick, P.C.

(57) ABSTRACT

In a microscope system in which at least one of a stage on which a sample 4 is mounted and an objective lens 6 can move relatively in a direction of an optical axis, a contact judgment section 12 judges the possibility of contact between the sample 4 and the objective lens 6 based on a result of comparison between a detection output from a contact sensor 11 which detects contact between the sample 4 and the objective lens 6 and a preset threshold value, excessive contact between the sample 4 and the objective lens 6 is avoided based on a result of this judgment, and a threshold value in the contact judgment section 12 is updated based on the output from the contact sensor 11 every predetermined time.

4 Claims, 14 Drawing Sheets

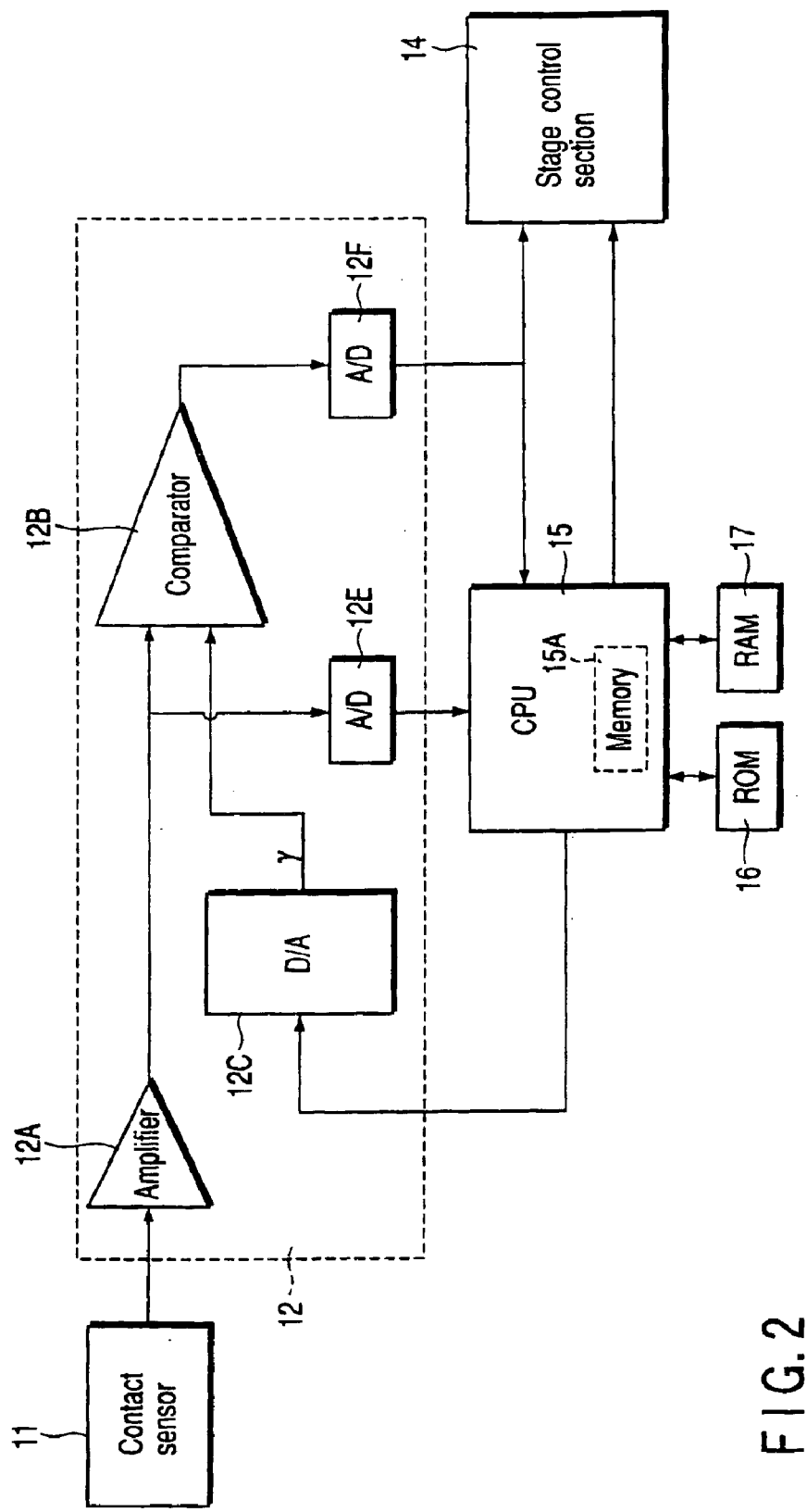
F I G. 2

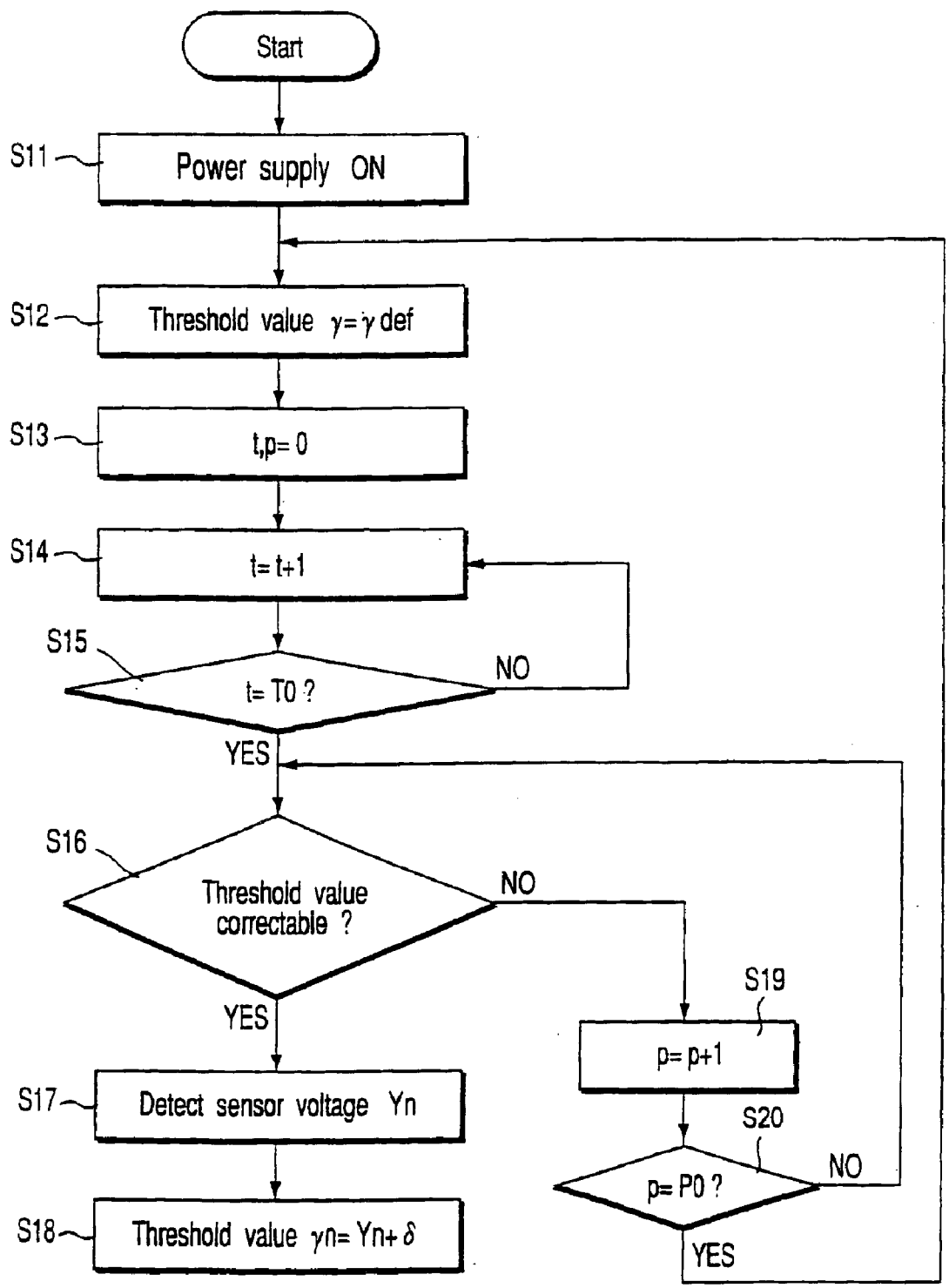
F I G. 5

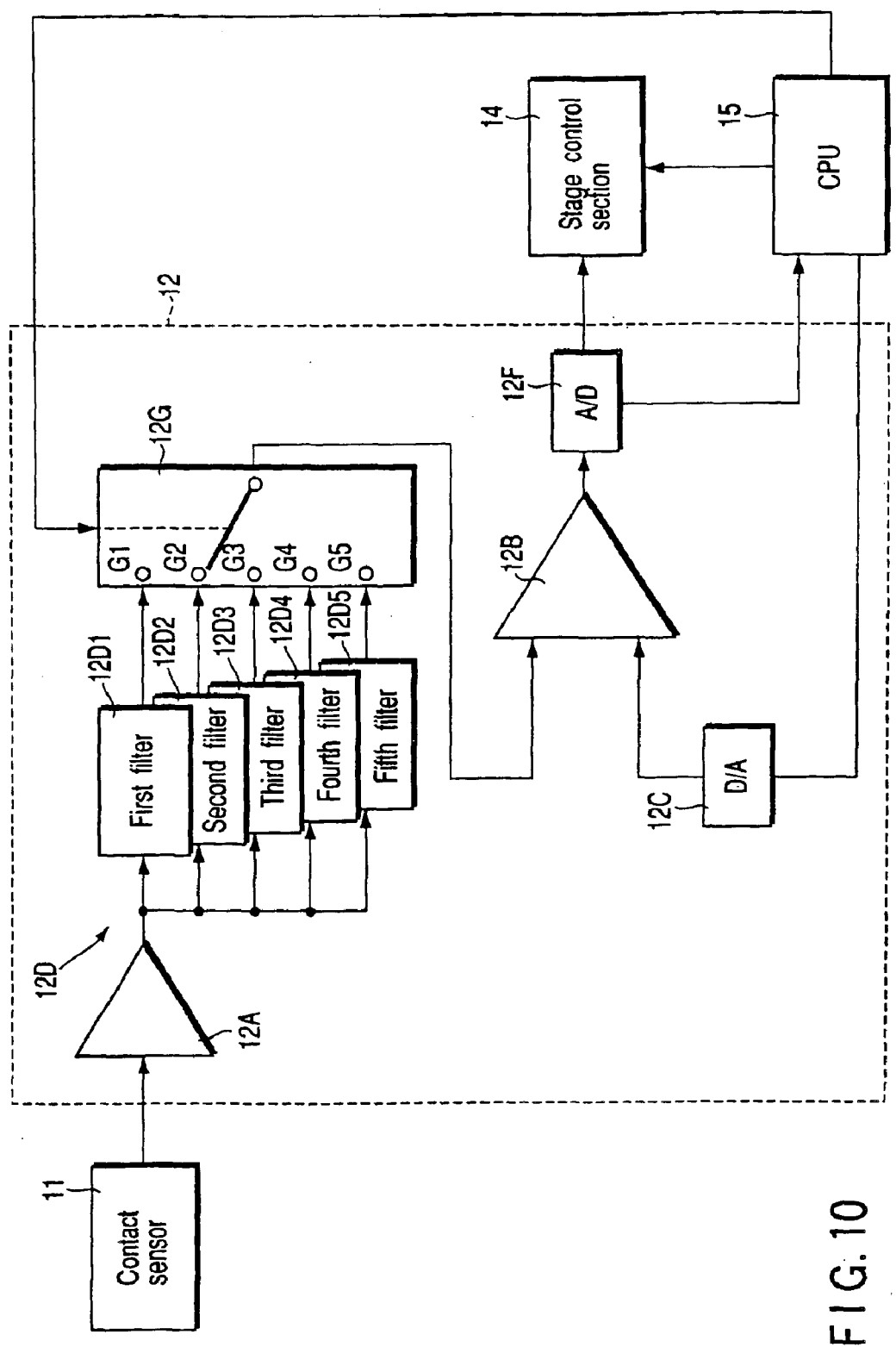
F I G. 10

MICROSCOPE SYSTEM

This is a continuation of application Ser. No. 10/094,722 filed on Mar. 11, 2002 now abandoned.

CROSS-REFERENCE TO RELATED APPLICATIONS

This application is based upon and claims the benefit of priority from the prior Japanese Patent Application No. 2001-069121, filed Mar. 12, 2001, the entire contents of which are incorporated herein by reference.

BACKGROUND OF THE INVENTION

1. Field of the Invention

The present invention relates to a microscope system, and more particularly to a microscope system having a function of preventing an observation object and an objective lens from coming into excessive contact with each other.

2. Description of the Related Art

Recently, a microscope which can observe an observation object, i.e., a subject with high magnification power is frequently used in inspection of a micro-fabricated IC wiring in the industrial field or examination in a cell nucleus in the medical field and the like.

Meanwhile, in order to observe a subject by using such a microscope with a high magnifying power and obtain an observation image of the subject with a high solution, it is required to use an objective lens with the high numerical aperture (NA).

However, the observation object and the objective lens move closer to each other as the objective lens with a high NA is used more frequently. For example, in the case of the 100-magnification powered objective lens with NA=0.9, the distance between the observation object and the objective lens, which is so-called W D (Working Distance) is 200 [$\mu$m].

However, when W D becomes shorter as mentioned above, the observation object and the objective lens are apt to come into contact with each other. In particular, in cases where the observation object is a micro-fabricated IC wiring or a very fine object such as a cell nucleus, the observation object may be possibly damaged when the objective lens comes into contact with the observation object. Further, if the observation object is a hard object made of, e.g., metal, when the objective lens is brought into contact with the observation object, the objective lens may be possibly damaged.

In order to avoid excessive contact between the observation object and the objective lens, various kinds of systems for preventing an excessive contact have been conventionally proposed. For example, Jpn. Pat. Appln. KOKAI Publication No. 5-26612 and Jpn. Pat. Appln. KOKAI Publication No. 10-260361 disclose a microscope system which prevents an observation object and an objective lens from coming into excessive contact with each other by providing a pressure sensor or a contact sensor which detects contact between the observation object and the objective lens.

In the system for preventing the excessive contact, in order to prevent the observation object or the objective lens from being damaged, the system is actuated in response to contact between the observation object and the objective lens before a damage occurs and interrupts the operation of the microscope. Therefore, in the system using the sensor, it is important that an output from the sensor is monitored and a threshold value used for judgment on contact can approximate the sensor output obtained immediately after contact as close as possible. As a result, the operation of the microscope can be rapidly interrupted, and the influence on the observation object can be suppressed as much as possible. However, since the sensor itself or a circuit for processing the sensor output is affected by a change in an ambient temperature, the actual threshold value is set with a margin. Thus, it may be sometimes impossible to correctly make judgment upon whether the observation object and the objective lens have come into contact with each other depending on how to set this margin. In particular, in the case of the microscope system using a transmitting type light source, in which light rays from the light source are transmitted through a sample as the observation object and the sample is observed with utilizing the transmitted light rays, a sensor is closely arranged to the observation object, and the transmitted light ray also enters this sensor during observation, and a temperature of the sensor itself may be possibly slightly changed. The characteristics of the sensor may possibly vary due to a change in temperature of the sensor and it is impossible to correctly make judgment upon whether the observation object and the objective lens have come into contact with each other.

In this point, the method for solving the above-described problem is not disclosed in both the microscope system using the pressure sensor disclosed in Jpn. Pat. Appln. KOKAI Publication No. 5-26612 and the microscope system using the contact sensor disclosed in Jpn. Pat. Appln. KOKAI Publication No. 10-260361. Therefore, in the prior art microscope systems disclosed in these publications, when the margin relative to the sensor output is too large, it is determined that the observation object and the objective lens have come into contact with each other based on an output from the sensor. Even if the operation of the microscope is interrupted, the observation object and the objective lens may be brought into contact with each other and the observation target may be damaged in some cases. Furthermore, if the margin with respect to the sensor output is too small, the operation of the microscope is interrupted even though the observation object and the objective lens are not in contact with each other, and stable judgment on contact is impossible.

BRIEF SUMMARY OF THE INVENTION

It is an object of the present invention to provide a microscope system having a function of preventing an excessive contact which can detect contact between an observation object and an objective lens with the high accuracy and prevent one or both of the observation object and the objective lens from being damaged when they are brought into contact with each other.

According to the present invention, there is provided a microscope system in which an objective lens for observing an observation object can be moved relatively in a direction of an optical axis with respect to a stage on which the observation object is mounted, the microscope system comprising:

detecting means for detecting a contact state corresponding to non-contact and contact between the observation object and the objective lens and outputting a signal in accordance with the contact state;

judging means for judging that the contact state between the observation object and the objective lens has exceeded a predetermined value based on an output from the detecting means, the judging means including threshold value setting means for setting a threshold value which is a reference for contact judgment and a comparator section for comparing the set threshold value with an output from the detecting means, the threshold value setting means resetting the threshold value based on an output from the detecting means when the observation object and the objective lens are separated from each other; and controlling means for controlling relative movement of the stage and the objective lens in response to the excessive contact signal.

Moreover, according to the present invention, there is provided a microscope system in which an objective lens for observing an observation object can be moved relatively in a direction of an optical axis with respect to a stage on which the observation object is mounted, the microscope system comprising:

detecting means for detecting a contact state corresponding to non-contact and contact between the observation object and the objective lens and outputting a detection signal in accordance with the contact state;

direct-current component eliminating means for eliminating a direct-current component from the detection output from the detecting means and generating a contact judgment signal;

judging means for judging that the contact state between the observation object and the objective lens has exceeded a predetermined value based on the contact judgment signal and outputting an excessive contact signal; and controlling means for controlling relative movement of the stage and the objective lens in response to the excessive contact signal.

In addition, according to the present invention, there is provided a microscope apparatus comprising:

a stage on which an observation object is mounted;

a plurality of objective lenses used for observing the observation object;

objective lens selecting means for selecting one objective lens from a plurality of the objective lenses and arranging this objective lens on an optical axis of a microscope;

moving means for relatively moving the selected objective lens with respect to the stage with a relative speed depending on the selected objective lens;

detection elements, provided at the corresponding objective lenses, for detecting a contact state corresponding to non-contact and contact between the observation object and the selected objective lens depending on selection of the objective lens, and outputs a detection signal corresponding to the contact state;

filtering means for generating a contact judgment signal obtained by eliminating a direct-current component from the detection signal;

judging means for judging that the contact state between the observation object and the objective lens has exceeded a predetermined value based on the contact judgment signal and outputting an excessive contact signal; and controlling means for controlling relative movement of the stage and the objective lens in response to the excessive contact signal.

In the microscope apparatus according to the present invention, since the possibility of excessive contact between the observation object and the objective lens can be judged based on the threshold value which is constantly updated in accordance with an ambient environment, a judgment result with the high accuracy can be obtained, and it is possible to avoid such a situation as that both the observation object and the objective lens are damaged due to excessive contact.

Additionally, since the threshold value is returned to a preset initial value when the state that the possibility of excessive contact between the observation object and the objective lens is low can not be confirmed for a predetermined time, the system does not have to wait until the state that the possibility of excessive contact between the observation object and the objective lens is low, thereby constantly setting an optimum threshold value according to the latest ambient environment.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram schematically showing a contact judgment section illustrated in FIG. 1;

FIG. 5 is a flowchart according to a second embodiment of the present invention, illustrating the operation of setting a threshold value for the contact judgment in the microscope system depicted in FIG. 1;

FIG. 10 is a block diagram showing a filter circuit according to a modification of the contact judgment section shown in FIG. 6;

DETAILED DESCRIPTION OF THE INVENTION

A microscope system having a function of preventing an excessive contact according to an embodiment of the present invention will now be described with reference to the accompanying drawings.

(First Embodiment)

Figure 1:
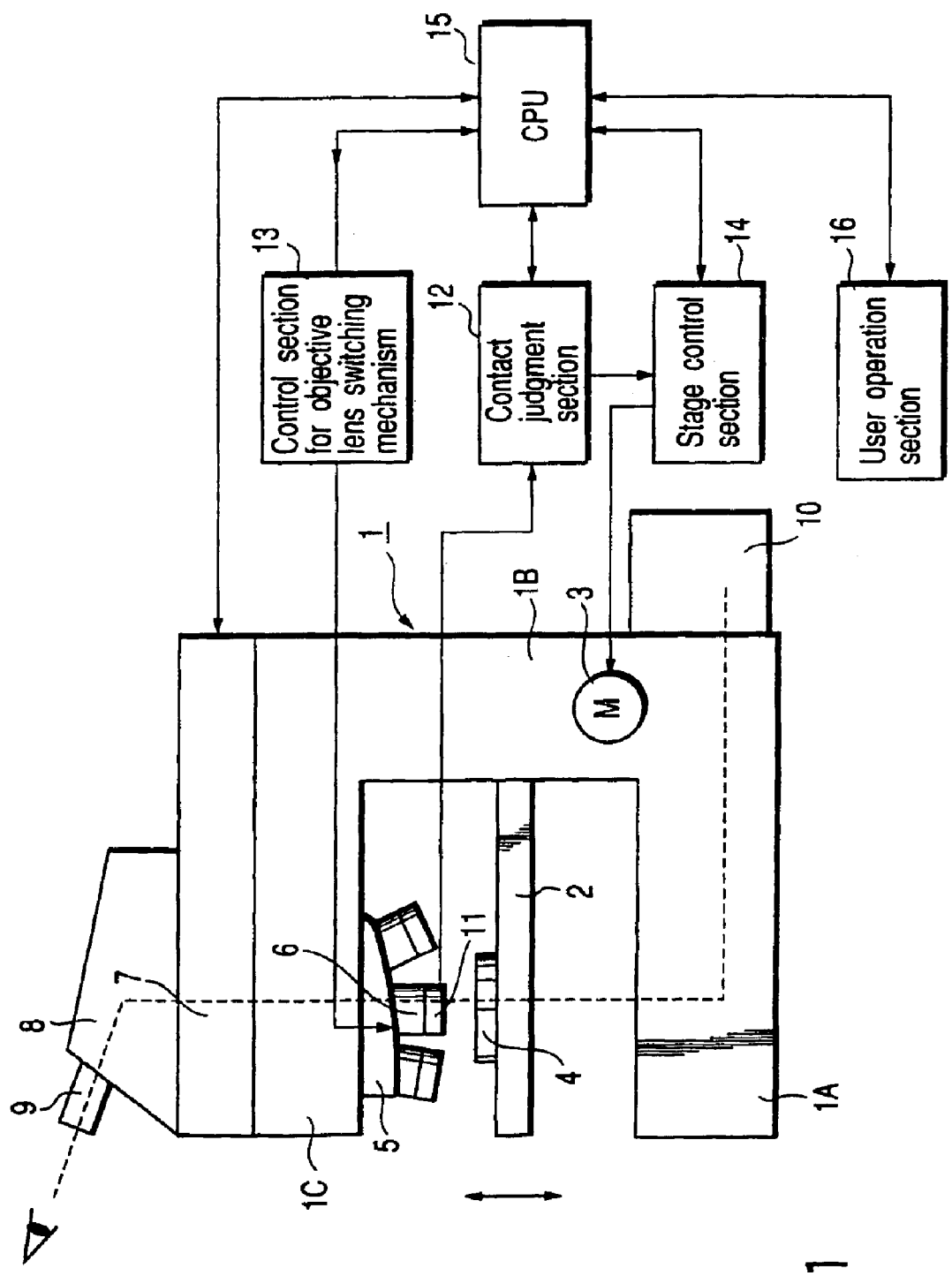
FIG. 1 is a block diagram schematically showing a microscope system according to a first embodiment of the present invention.

FIG. 1 schematically shows a microscope system having an excessive contact prevention function according to an embodiment of the present invention. In FIG. 1, reference numeral 1 denotes a microscope main body, and the microscope main body 1 has a base portion 1A in the horizontal direction and a trunk portion 1B provided endways with respect to the base portion 1A. An objective arm 1C parallel to the base portion 1A is provided to an end part of the trunk portion 1B.

A stage 2 is provided to the trunk portion 1B of the microscope main body 1 so as to be capable of moving in the vertical direction along the direction of an optical axis of a later-described objective lens 6. This stage 2 can be electrically driven in the vertical direction by a stage motor 3. A sample 4 is mounted on the stage 2.

An electric revolver 5 is provided on the objective arm 1C. A plurality of objective lenses 6 are provided on the revolver 5 so as to be opposed to the sample 4 on the stage 2 For example, five objective lenses are provided on the revolver 5 in a sophisticated microscope. When the revolver 5 is operated to rotate, these objective lenses 6 are selectively switched on the optical path, and one objective lens 6 selected by a user is arranged on the optical path. An AF (auto focus) unit 7 is provided above the objective arm 1C, and a body tube 8 is provided above the AF (auto focus) unit 7. An eyepiece 9 is provided to the body tube 8.

A transmission type light source 10 is provided under the trunk portion 1B of the microscope main body 1. Illumination light rays from the transmission light source 10 enters the sample 4 from the lower part of the stage 2 through an ND filter, an aperture stop and a field stop which are arranged in the base portion 1A and not illustrated, and the light flux which has transmitted through the sample 4 passes through the objective lens 6 and the AF unit 7. A part of the light flux is led to the eyepiece 9 through the body tube 8.

A contact sensor 11, which detects contact between the sample 4 and the objective lens 6, is provided at an end part of the objective lens 6. This contact sensor 11 detects slight contact between the sample 4 and the objective lens 6 with the high accuracy. In this specification, the contact between the sample 4 and the objective lens 6 means the state that the sample 4 and the objective lens 6 are brought into contact with each other so as not to damage one of them, and the excessive contact between the sample 4 and the objective lens 6 means strong contact such that the pressure is given to both the sample 4 and the objective lens 6 or sudden contact such that the strong pressure is instantaneously given to the both members, and damage to any one of them as a result of excessive contact is no object. Further, as the contact sensor 11, any kind of sensor can be adopted as long as it is a sensor which detects contact between the sample 4 and the objective lens 6 and generates a predetermined output.

A contact judgment section 12 for judging contact is connected to the contact sensor 11, an objective lens switching mechanism control section 13 is connected to an objective lens switching mechanism in the revolver 5, and a stage control section 14 is connected to the stage motor 3, respectively. A CPU 15 for controlling each section is connected to the contact judgment section 12, the objective lens switching mechanism control section 13 and the stage control section 14. Furthermore, the AF unit 7 and a user operation section 16 are connected to the CPU 15. The contact sensor 11 is connected to the contact judgment section 12 through signal lines extending through a mount of the objective lens 11, the revolver 5 and the objective arm 1C and a connection mechanism which electrically connects the signal lines. The signal line and the connection mechanism are disclosed in Japanese KOKAI Publication 2000-199858. The detail description of the signal line and the connection mechanism is omitted, because the above described publication cited and describes the detail of the signal line and the connection mechanism.

When the contact sensor 11 detects contact between the sample 4 and the objective lens 6 and a predetermined output is detected, the contact judgment section 12 outputs a contact signal to the CPU 15.

The CPU 15 controls the stage control section 14 based on a default signal from the AF unit 7. That is, in response to the default signal, the stage control section 14 drives the stage motor 3 in order to move up and down the stage 2, and varies a relative distance of the sample 4 and the objective lens 6 to control focusing of the objective lens 6. Moreover, in response to the default signal, the CPU 15 sends a command to the control section 13 of the objective lens switching mechanism to switch the objective lens and locate a predetermined objective lens 6 on the optical path. In addition, when the contact judgment section 12 determines contact between the sample 4 and the objective lens 6, the CPU 15 indicates the stage control section 14 to avoid excessive contact, and the stage control section 14 immediately stops the movement control of the stage 2 and restricts the movement of the stage in the direction along which the sample 4 and the objective lens 6 come into contact with each other in response to the direction to avoid excessive contact.

Various kinds of instructions can be inputted into the operation section 16 by a user. That is, for example, an instruction of turning on/off the auto-focusing operation of the AF unit 7 or an instruction of switching of the objective lenses 6 is send from the CPU 15 in accordance with a user operation in the user operation section 16.

FIG. 2 shows a schematic block of the contact judgment section 12. The contact judgment section 12 is constituted by an amplifier 12A, a comparator 12B, a D/A converter 12C, and A/D converters 12E and 12F. In the contact judgment section 12, a detection signal inputted from the contact sensor 11 is amplified in the amplifier 12A and inputted to one input terminal of the comparator 12B as an output voltage. A contact judgment threshold value γ is inputted to the other input terminal of the comparator 12B from the CPU 15 through the D/A converter 12C. A default value of the contact judgment threshold value γ is stored in a ROM 16. When judgment in the contact judgment section 12 starts, the default threshold value γ is stored in a memory 15A in the CPU 15, this threshold value γ is converted into an analog signal by a D/A converter 12C, and the analog signal of the threshold value signal is supplied to the comparator 12B. The comparator 12B compares the contact judgment threshold value γ with an output voltage from the contact sensor 11. When the output voltage from the contact sensor 11 is larger than the contact judgment threshold value γ, the comparator 12B determines that the sample 4 and the objective lens 6 are in contact and outputs a contact signal to the CPU 15 and the stage control section 14. In response to this contact signal, the stage control section 14 immediately stops the movement control of the stage 2, the CPU 15 responds to this control signal, and the stage control section 14 moves the stage 2 away from the objective lens 6 by a predetermined distance. It is to be noted that the threshold value γ can be updated as will be described, will be inputted to the CPU 15, the updated threshold value γ can inputted to the memory 15A in the CPU 15, and the updated threshold value γ can be also stored in a RAM 17. A program concerning the operation for updating the threshold value is stored in the ROM 16.

Figure 3A:
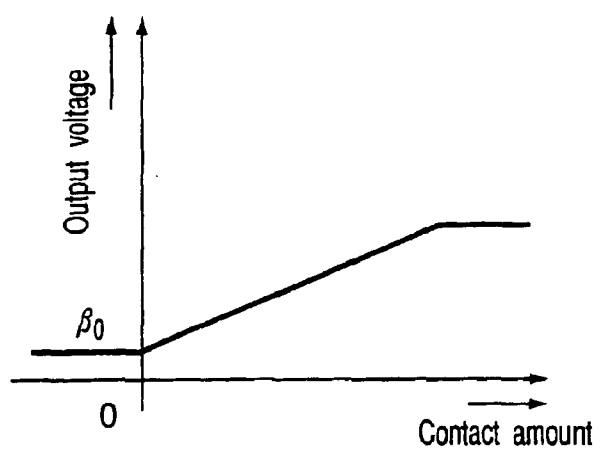
FIGS. 3A to 3C are graphs respectively showing output characteristics of a contact sensor illustrated in FIG. 2.

Here, the contact sensor 11 has such output characteristics as shown in FIG. 3A. In FIG. 3A, a horizontal axis represents a pressure applied to the sensor, namely, an amount of contact, and a vertical axis represents an output voltage from the sensor. In addition, the contact sensor 11 has characteristics such as represented in the following expression (1) in which the output voltage y increases in proportion to the pressure x applied to the sensor. It is to be noted that β0 in the expression (1) is an offset that a processing circuit of the sensor itself has.

$$\text{Output voltage } y = \alpha x + \beta 0 \qquad (1)$$

Therefore, in order to detect contact between the sample 4 and the objective lens 6 as fast as possible by using an output from such a contact sensor 11, it can be understood that the output voltage y can be approximated to β0 from the expression (1) as close as possible. Additionally, assuming that the contact judgment threshold value set by the above-described CPU 15 is γ, approximating the contact judgment threshold value γ to β as close as possible can accurately judge contact. Here, if the contact judgment threshold value γ is too larger than β, a large contact pressure is applied between the sample 4 and the objective lens 6, and the damage to the both members becomes large. Further, if the contact judgment threshold value γ is too smaller than β, there occurs erroneous judgment that contact is determined even if the sample 4 and the objective lens 6 are not in contact.

The offset β in the expression (1), which is set in the processing circuit of the sensor, mainly depends on an ambient environment, and an environmental temperature in particular. When a temperature of the processing circuit is drifted based on a change in the environmental temperature or a resistance value is changed, the offset β is fluctuated as with a value β1 shown in FIG. 3B or a value β2 shown in FIG. 3C. Therefore, in general, it is necessary that a quantity of fluctuation of the offset β is predicted in advance and the contact judgment threshold value γ is set.

In the microscope system according to the first embodiment, even if the offset β fluctuates in accordance with the ambient environment, the constantly optimum contact judgment threshold value γ is set as follows.

Figure 3B:
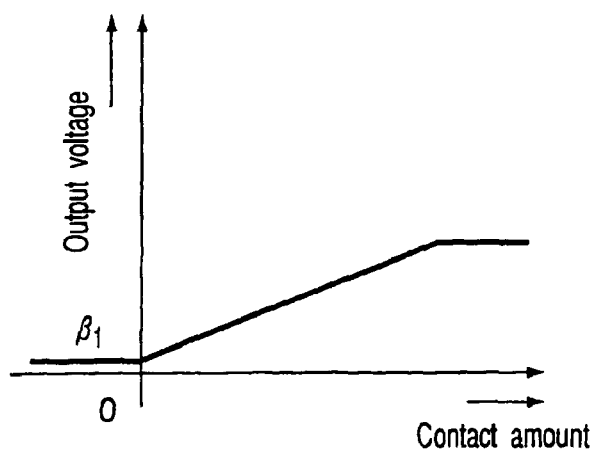
Figure 4:
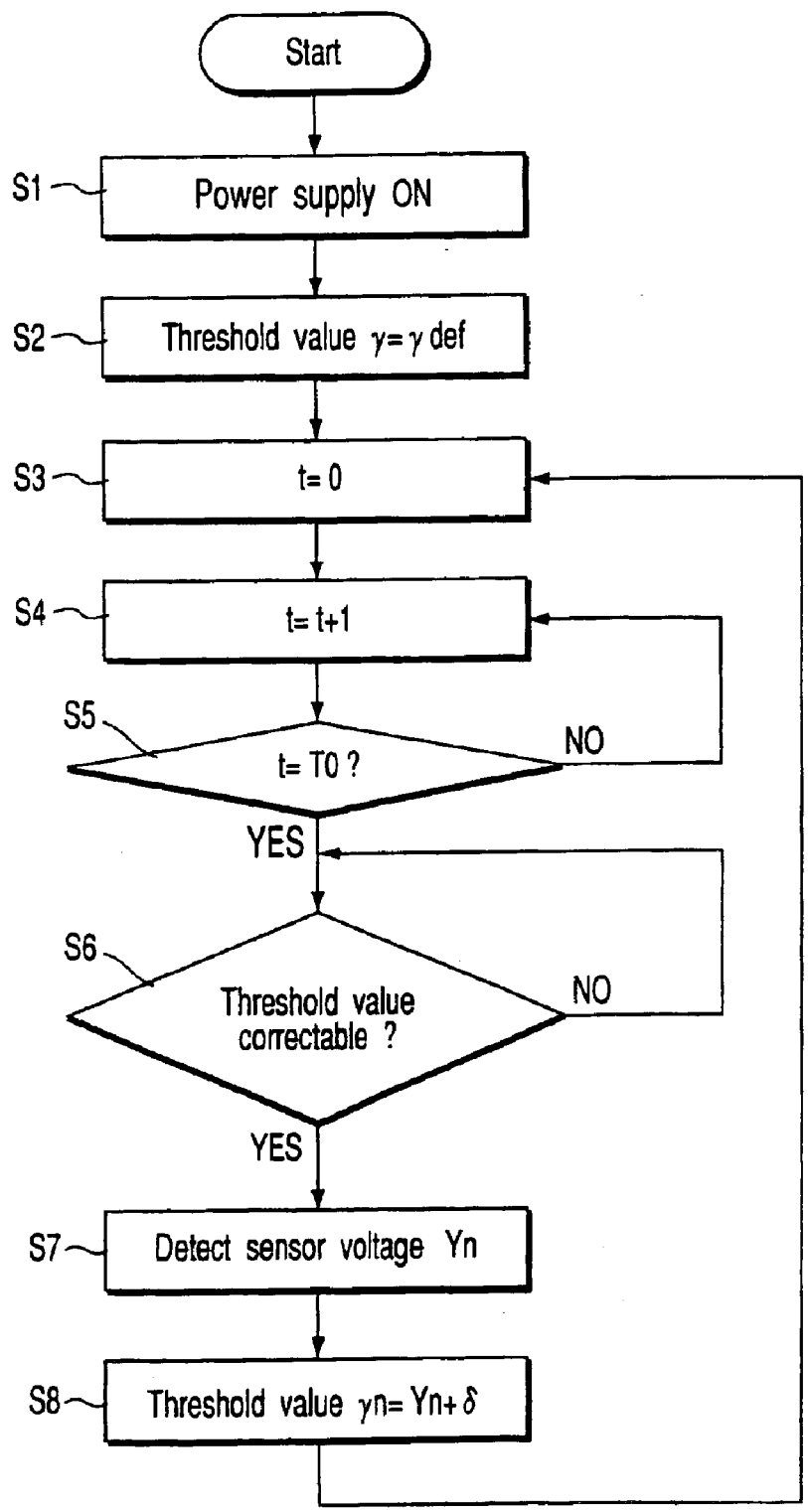
FIG. 4 is a flowchart illustrating the operation of setting a threshold value for a contact judgment in the microscope system shown in FIG. 1.

FIG. 4 is a flowchart showing a procedure for setting the contact judgment threshold value γ. In the procedure shown in FIG. 4, when a power supply is turned on (step S1), the contact judgment threshold value γ is first set to a predetermined value γdef which is a default value (step S2). This default value γdef is a value MAX which is adopted in accordance with the environment using the microscope system and corresponds to, e.g., a value obtained by giving a further margin to the offset β1 shown in FIG. 3B.

Subsequently, the time t is initialized (step S3), and then judgment is repeatedly made upon whether the time t has reached a predetermined time T0 corresponding to a correction timing with elapse of the time t (steps S4 and S5). Here, confirmation is made upon whether it is the state that the possibility of contact between the sample 4 and the objective lens 6 is lowest and the state that the threshold value can be corrected every time the time t reaches the predetermined time T0 (step S6).

Here, the following cases (a) to (d) correspond to the state that the threshold value can be corrected.

(a) When the stage 2 is placed at a lower limit position at the time of initialization or the like of the stage 2 for the start of the auto-focusing.

(b) When the stage is moved away from the objective lens and the stage 2 is placed at the lowest position for switching the objective lens.

(c) When the stage is moved away and the stage 2 is placed at the lowest position to replace the sample 4.

(d) Focusing state when the objective lens focuses on the sample.

The cases of (a) to (d) all correspond to the fixed state of the stage that the stage can not be moved. Furthermore, the stage 2 is controlled by the stage control section 14, and this control status is constantly monitored by the CPU 15. Therefore, the state that the threshold value can be corrected is monitored by the CPU 15.

When it is determined that the threshold value can be corrected, the CPU 15 detects an output voltage yn of the contact sensor 11 (step S7), adds a predetermined margin δ to this output voltage yn and outputs a result as a contact judgment threshold value γn.

The thus set contact judgment threshold value γn is temporarily stored in the memory 15A of the CPU 15 as shown in FIG. 2 and supplied to the other input terminal of the comparator 12B through the D/A converter 12C. The comparator 12B compares the contact judgment threshold value γn with the output voltage yn of the contact sensor 11. When it is determined that the output voltage from the contact sensor 11 is larger than the contact judgment threshold value γn, it is decided that the sample 4 and the objective lens 6 are in contact with each other, and the movement control of the stage 2 by the stage control section 14 is immediately stopped by an instruction from the CPU 15.

In such a microscope system, judgment is made upon whether the threshold value can be corrected every predetermined time T0. If the threshold value can be corrected, the output voltage yn of the contact sensor 11 at this moment is determined as a reference, a predetermined margin δ is added to this output voltage yn and a new contact judgment threshold value γn is obtained (step S8). Contact is detected by using the updated contact judgment threshold value γn. Therefore, contact is judged by using the contact judgment threshold value γn which is constantly updated in accordance with the ambient environment, and the accurate judgment result can be thereby obtained. As a result, it is possible to avoid a situation such that both of the sample 4 and the objective lens 6 are damaged due to excessive contact, thus assuredly protecting the sample 4 and the objective lens 6. Further, it is possible to eliminate a situation that the operation of the microscope is interrupted even through the sample 4 and the objective lens 6 are not in contact with each other, and hence the constantly stable operation can be expected.

(Second Embodiment)

A microscope system according to a second embodiment of the present invention will now be described.

In this case, since the microscope system and the contact judgment section to which the second embodiment is applied are similar to those shown in FIGS. 1 and 2 explained in connection with the first embodiment, these drawings are again used, and description will be given as follows as to a method for setting the contact judgment threshold value γ with reference to the flowchart of FIG. 5.

In the method for setting the contact judgment threshold value γ, when the power supply is turned on (step S11), the contact judgment threshold value γ is set to a default predetermined value γdef (step S12) This predetermined value γdef is a value MAX adopted in accordance with the environment using this apparatus and corresponds to, e.g., a value obtained by further setting a margin to β1 shown in FIG. 3B.

Then, the time t and an uncorrectable period p are initialized to 0 (step S13), and then judgment is repeatedly made upon whether the time t has passed and reached a predetermined time T0 (steps S14 and S15). Confirmation is made upon whether the threshold value can be corrected every time the time t reaches the predetermined time T0 (step S16). Here, judgment upon whether the threshold value can be corrected is similar to that illustrated in FIG. 4.

At the step S16, when it is determined that it is not a timing of correcting the threshold value, the uncorrectable period p corresponding to a reset timing is counted (step S19). Furthermore, judgment is made upon whether the uncorrectable period p has reached a predetermined period P0 (step S20). If it is determined that the uncorrectable period p has not reached the period P0 at this step S20, judgment is further made upon whether the threshold value can be corrected (step S16). Here, if it is determined that the threshold value can be corrected before the period p reaches the period P0, the CPU 15 detects the output voltage yn of the contact sensor 11 (step S17), adds a predetermined margin δ to the output voltage yn, determines an updated contact judgment threshold value γn, stores the contact judgment threshold value γn in the memory 15A and outputs the contact judgment threshold value γn (step S18).

When the state that correction is not permitted has passed the predetermined period P0 (p=P0), the processing returns to the step S12, the contact judgment threshold value γ is returned to a large default value γdef similar to that when the power supply is turned on, and the operation of the step S13 and the subsequent steps is repeated.

Incidentally, the predetermined time T0 corresponding to the correction timing and the uncorrectable period P corresponding to the reset timing are set as fixed values respectively, but attention may be paid on the fact that a change in temperature is largest when the power supply is turned on, and the time T0 and the period P may be varied in accordance with the time after turning on the power supply.

In such a microscope system according to the second embodiment, as similar to the microscope system according to the first embodiment, contact between the objective lens and the sample is judged based on the contact judgment threshold value γ which is constantly updated in accordance with the ambient environment, thereby obtaining a judgment result with the high accuracy. As a result, it is possible to avoid such a situation as that both the sample 4 and the objective lens 6 are damaged due to excessive contact, and the sample 4 and the objective lens 6 can be assuredly protected. Furthermore, it is possible to eliminate a situation that the operation of the microscope is interrupted even though the sample 4 and the objective lens 6 are not in contact with each other, and the constantly stable operation can be hence expected. In the microscope system according to the second embodiment, when the state that correction is not permitted continues for the predetermined period P0, the contact judgment threshold value γ is returned to the initial large value γdef, and the operation for setting is again executed. Therefore, the apparatus does not have to wait in the judgment mode for making judgment upon whether the threshold value can be corrected, and it is possible to constantly set the optimum contact judgment threshold value γ according to the latest ambient environment.

Incidentally, although description has been given as to the system in which the stage 2 is moved up and down with respect to the objective lens 6 in the foregoing embodiments, the present invention may be applied to a system which moves up and down the objective lens 6. Moreover, although description has been given as to the example in which the contact sensor 11 for detecting contact between the sample 4 and the objective lens 6 is provided to the objective lens 6, the contact sensor 11 may be provided at any position other than the objective lens 6, for example, the revolver 5. In addition, although the contact sensor 11 for detecting contact between the sample 4 and the objective lens 6 is used in the foregoing embodiments, a baresthesia sensor or the like which detects, e.g., a change in the resistance value may be used. Additionally, although in the above described embodiment, the contact state between the observation object and the objective lens is detected, the present invention can be applied to a system which detects the possibility of excessive contact from abnormal approach of the observation object and the objective lens and protects them.

(Third Embodiment)

A microscope system according to a third embodiment of the present invention will now be described.

Figure 6:
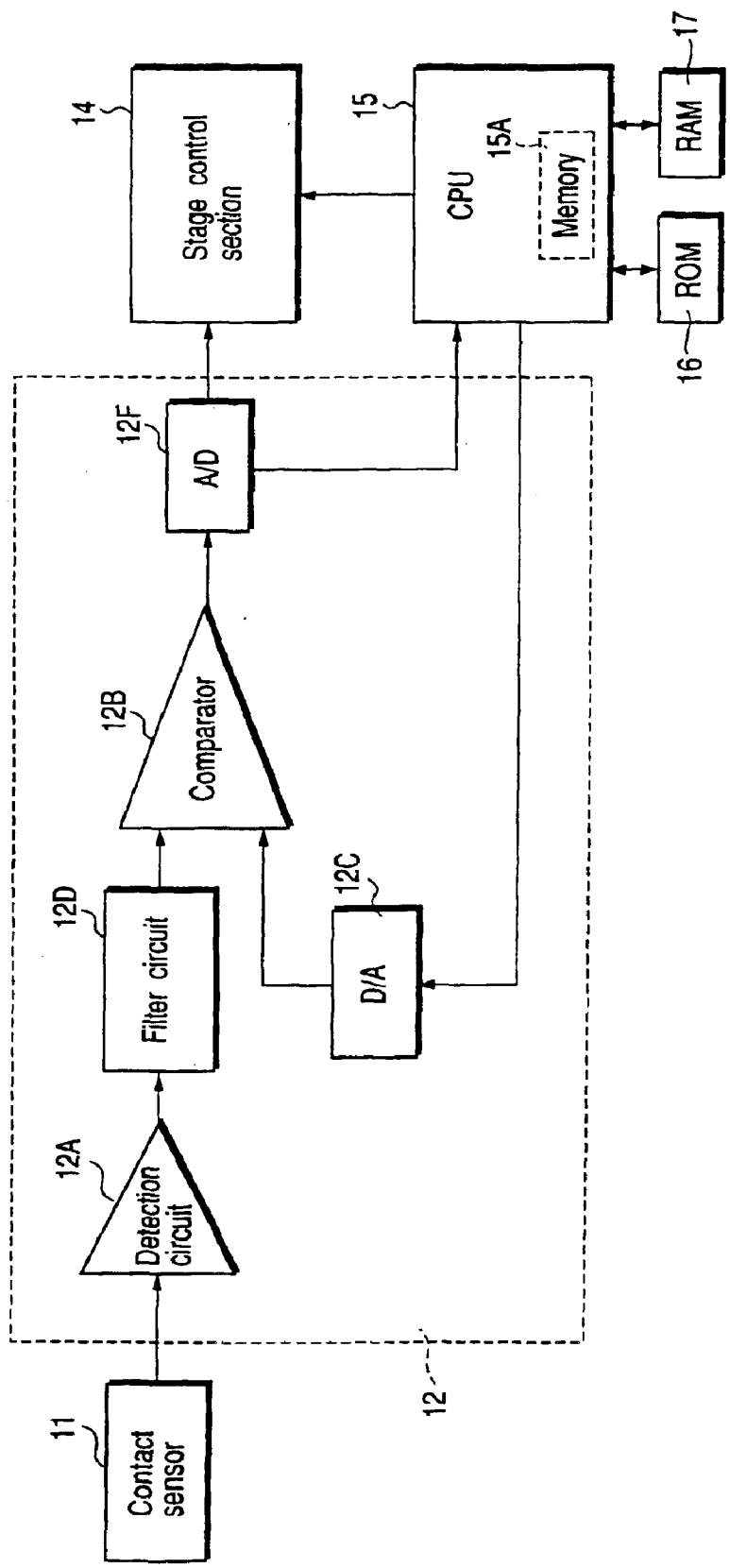
FIG. 6 is a block diagram schematically showing a contact judgment section according to a third embodiment of the present invention depicted in FIG. 1.

In the microscope system according to the third embodiment of the present invention, the contact judgment section 12 shown in FIG. 1 has a circuit configuration such as illustrated in FIG. 6.

As shown in FIG. 6, the contact judgment section 12 is constituted by a detection circuit 12A, a comparator 12B, a D/A converter 12C, an A/D converter 12F, and a filter circuit 12D which eliminates a direct-current component from a detection signal from a contact sensor 11.

When the contact sensor 11 touches a sample 4, an output is generated from the sensor 11 depending on the contact, e.g., the contact force or the pressure. This detection output is supplied to the detection circuit 12A and amplified. An amplified signal from the detection circuit 12A is supplied to the filter circuit 12D.

Figure 7A:
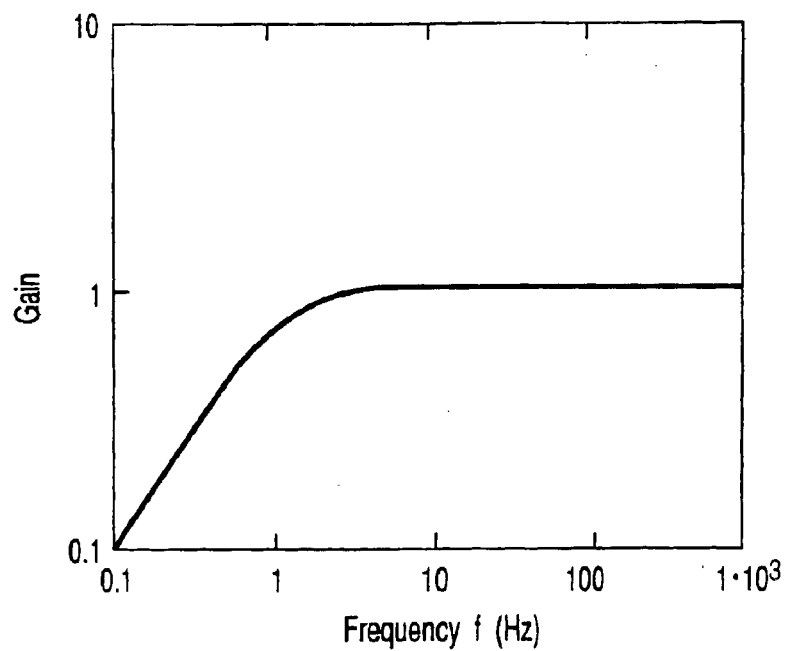
FIGS. 7A and 7B are graphs showing gain characteristics of a filter circuit shown in FIG. 6.
Figure 7B:
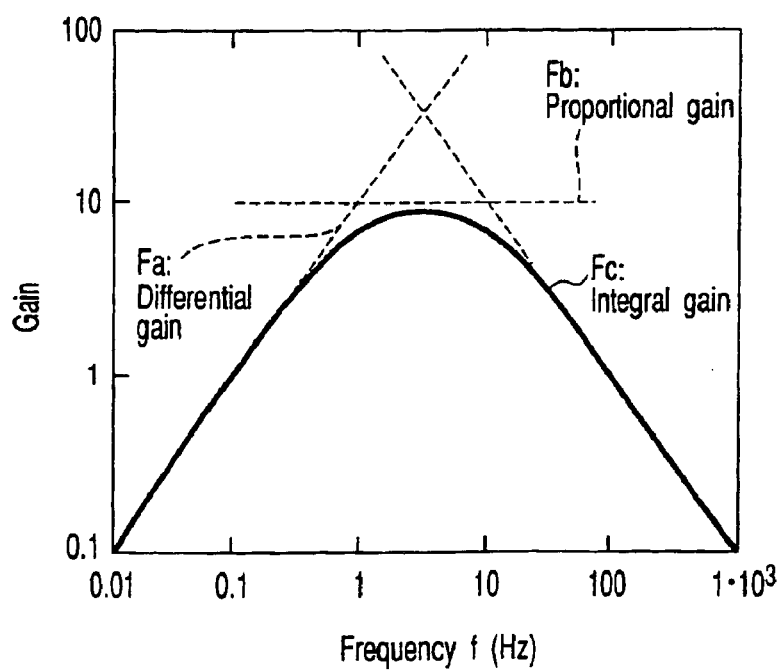

The filter circuit 12D has a filter having gain characteristics shown in FIGS. 7A and 7B, an unnecessary frequency component in the detection signal from the detection circuit 12A is cut, and only a signal of a necessary frequency band is outputted.

FIG. 7A shows gain characteristics with respect to a frequency f of a primary high-pass filter. As apparent from FIG. 7A, since the gain of a low-frequency component (not more than the cutoff frequency of 5 Hz) is low, a DC component in the detection signal, i.e., the low-frequency component is substantially eliminated in the filter circuit 12D including a filter having such characteristics. As to the cutoff frequency, it is desirable that a rate of rise of an output, i.e., a frequency of an output from the detection circuit 12A at the time of contact is obtained based on the operation speed of the stage 2 and the detection sensitivity of the sensor 11 and frequency not more than the obtained frequency is eliminated so that the low-frequency noise such as the vibration noise can be cut as much as possible in addition to the DC component. It is to be noted that such a high-pass filter is not restricted to have the primary characteristics and the similar advantage can be obtained when the high-pass filter has the secondary or higher-order characteristics.

FIG. 7B shows characteristics of the band-pass filter in which differential gain characteristics Fa, proportional gain characteristics Fb and integral gain characteristics Fc are combined. By supplying such characteristics of the band-pass filter to the filter circuit 12D, the low-frequency component including the DC component and the high-frequency component are eliminated based on the differential gain characteristics Fa, the proportional gain characteristics Fb and the integral gain characteristics Fc.

In the filter circuit 12D including a filter having gain characteristics shown in FIGS. 7A and 7B, the low-frequency noise in the detection signal from the detection circuit 12A is cut by a primary high-pass filter shown in FIG. 7A, or the low-frequency noise including the DC component and the high-frequency noise are cut by the band-pass filter shown in FIG. 7B, and only a signal of a necessary frequency band is amplified and outputted.

An output from the filter circuit 12D is supplied to one input terminal of the comparator 12B. To the other input terminal of the comparator 12B is supplied a threshold voltage obtained by converting digital data outputted from the CPU 15 into analog data by the D/A converter 12C. The comparator 12B compares a threshold voltage supplied from the CPU 15 with an output voltage from the filter circuit 12D. When an output voltage from the filter circuit 12D is larger than the threshold voltage, it is determined that the objective lens 6 and the sample 4 are in contact with each other, and a contact signal is supplied from the comparator 12B to the CPU 15 and the stage control section 14.

Here, if the stage 2 is moving, the stage control section 14 temporarily forcibly stops the operation of the stage 2 in response to the contact signal. Additionally, in response to the contact signal, the CPU 15 outputs to the stage control section 14 an instruction to return the stage 2 and moves away the stage so as to give between the sample 4 and the objective lens 6 a sufficient distance such that the sample 4 and the objective lens 6 do not come into further contact with each other.

On the other hand, when the stage 2 remains stationary, since there is the possibility of an erroneous operation of the stage 2, the stage control section 14 temporarily forcibly stops the operation of the stage 2 in response to the contact signal. Further, the CPU 15 outputs to the stage control section 14 an instruction to return the stage 2 and moves away the stage so as to give between the sample 4 and the objective lens 6 a sufficient distance that the sample 4 and the objective lens 6 do not come into further contact with each other.

In such a microscope system, the contact sensor 11 is provided at an end part of the objective lens 6, and the fact that the end part of the objective lens 6 is brought into contact with the sample 4 on the stage 2 is detected based on movement of the stage 2 by the contact sensor 11. A detection output from the contact sensor 11 is supplied to the filter circuit 12D. In the filter circuit 12D, the low-frequency noise including the DC component is cut by the primary high-pass filter shown in FIG. 7A, the low-frequency noise including the DC component and the high-frequency noise are cut by the band-pass filter shown in FIG. 7B, and only a signal of a necessary frequency band is amplified and supplied to the comparator 12B. In the comparator 12B, the detection signal is compared with the threshold voltage, and contact between the objective lens 6 and the sample 4 is judged based on a result of this comparison.

In this case, in the primary high-pass filter shown in FIG. 7A, a rising frequency of an output from the detection circuit 12A at the time of contact is obtained based on the operation speed of the stage 2 and the detection sensitivity of the contact sensor 11 so that the low-frequency noise such as the vibration noise can be cut as much as possible in addition to the DC component, and the primary high-pass filter is set so as to cut a frequency which is not greater than the obtained frequency. Further, the band-pass filter shown in FIG. 7B is set so as to eliminate the low-frequency component including the DC component and the high-frequency component based on the differential gain characteristics Fa, the proportional gain characteristics Fb and the integral gain characteristics Fc. Therefore, it is possible to eliminate the influence of slight drift due to a change in environment with respect to the contact sensor 11 itself and the processing means on the following stage, for example, changes in temperature or humidity or a change in time.

As a result, in the comparator 12B, the detection signal is compared with the threshold voltage, and contact between the objective lens 6 and the sample 4 can be accurately and rapidly detected based on a result of comparison. Consequently, even if an accident that the objective lens 6 and the sample 4 come into contact with each other occurs, the operation of the stage 2 can be temporarily forcibly stopped, and the operation which avoids further contact between the sample 4 and the objective lens 6 can be accurately and rapidly executed, thereby minimizing the damage to both the objective lens 6 and the sample 4.

Furthermore, by setting the threshold value in the comparator 12B, it is possible to prevent an erroneous operation which may possibly occur due to the noise component other than the DC component, which correspond to a drift component, for example, electrical noise such as power supply noise or mechanical noise such as vibration, thereby enabling the accurate judgment on contact.

Although the filter circuit 12D shown in FIG. 6 includes the high-pass filter depicted in FIG. 7A and the band-pass filter illustrated in FIG. 7B, it may include only one of these filters.

The characteristics of this band-pass filter may be set as follows. In the microscope system shown in FIG. 1, there are provided five objective lenses 6, for example, five-powered, 10-powered, 20-powered, 50-powered and 100-powered objective lenses 6, and the contact sensor 11 having the same detection sensitivity is attached to each objective lens 6. Incidentally, only three objective lenses 6 are shown in FIG. 1 for the purpose of simplifying the drawing, and two objective lenses 6 positioned at the rear side of the three objective lenses are not shown in FIG. 1.

The sensitivity of the contact sensor 11 is represented by an output from the detection circuit 12A, and this output sensitivity is determined as follows:

$$S \text{ V}/\mu m \text{ (for example, 1 V}/\mu m)$$

In the following, description will be given is a typical example in the system provided with the contact sensor 11 of a high-sensitivity type (S V/μm=1 V/μm). However, there is also the contact sensor 11 which is of a low-sensitivity type (S V/μm=0.1 V/μm). The characteristics of the band-pass filter (BPF) will be also described later in the system provided with the contact sensor 11 of the low-sensitivity type.

Moreover, the moving speed of the stage 2 is changed in accordance with a type of the objective lens 6 selected by the stage control section 14. That is, the moving speed of the stage 2 is set in accordance with the power of the objective lens 6, and the focusing control optimum for the selected objective lens 6 executed. Here, the moving speed with respect to each objective lens 6 is set as shown in the following Table 1.

TABLE 1

| Power of objective lens | Moving speed of stage | Example of moving speed |
|---|---|---|
| 5 power | x mm/s | 1 mm/s |
| 10 power | x/2 mm/s | 0.5 mm/s |
| 20 power | x/4 mm/s | 0.25 mm/s |
| 50 power | x/10 mm/s | 0.1 mm/s |
| 100 power | x/20 mm/s | 0.05 mm/s |

The moving speed of the stage in Table (1) is set in proportion to the focusing depth of the objective lens.

Outputs from the detection circuit 12A corresponding to the sensitivity of the contact sensor 11 and depending on the stage moving speed are shown in the following Table (2) in relation to the respective objective lens.

TABLE 2

| Power of objective lens | Output voltage | Example of output voltage |
|---|---|---|
| 5 power | S V/ms | 1 V/ms |
| 10 power | S/2 V/ms | 0.5 V/ms |
| 20 power | S/4 V/ms | 0.25 V/ms |
| 50 power | S/10 V/ms | 0.1 V/ms |
| 100 power | S/20 V/ms | 0.05 V/ms |

Figure 8:
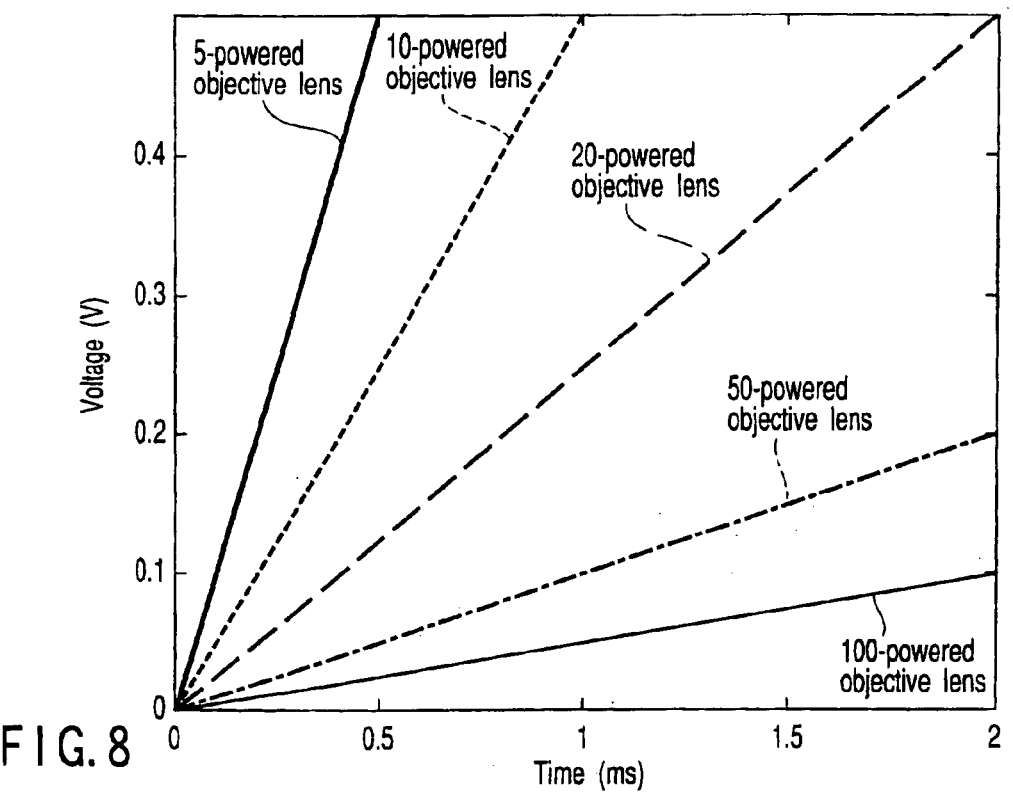
FIG. 8 is a graph showing the relationship between elapse of time after start of contact of a contact sensor with a sample and an output voltage of a detection circuit corresponding to a sensitivity of each contact sensor in the contact judgment section illustrated in FIG. 6.

FIG. 8 shows the relationship between elapse of time after the start of contact and an output (voltage) from the detection circuit 12A, the start moment of contact being determined as 0, and the output depending on the sensitivity of the sensor 11 provided at each objective lens 6. Here, assuming that the threshold value of the comparator 12B is rV (for example, 0.1 V), the time period is shown in the following Table (3), which is required for an output from the detection circuit 12A with respect to each objective lens to reach the threshold value.

TABLE 3

| Power of objective lens | Time period to reach threshold | Example of time period to reach threshold value |
|---|---|---|
| 5 power | r/S ms | 0.1 ms |
| 10 power | 2r/S ms | 0.2 ms |
| 20 power | 4r/S ms | 0.4 ms |
| 50 power | 10r/S ms | 1 ms |
| 100 power | 20r/S ms | 2 ms |

Figure 9:
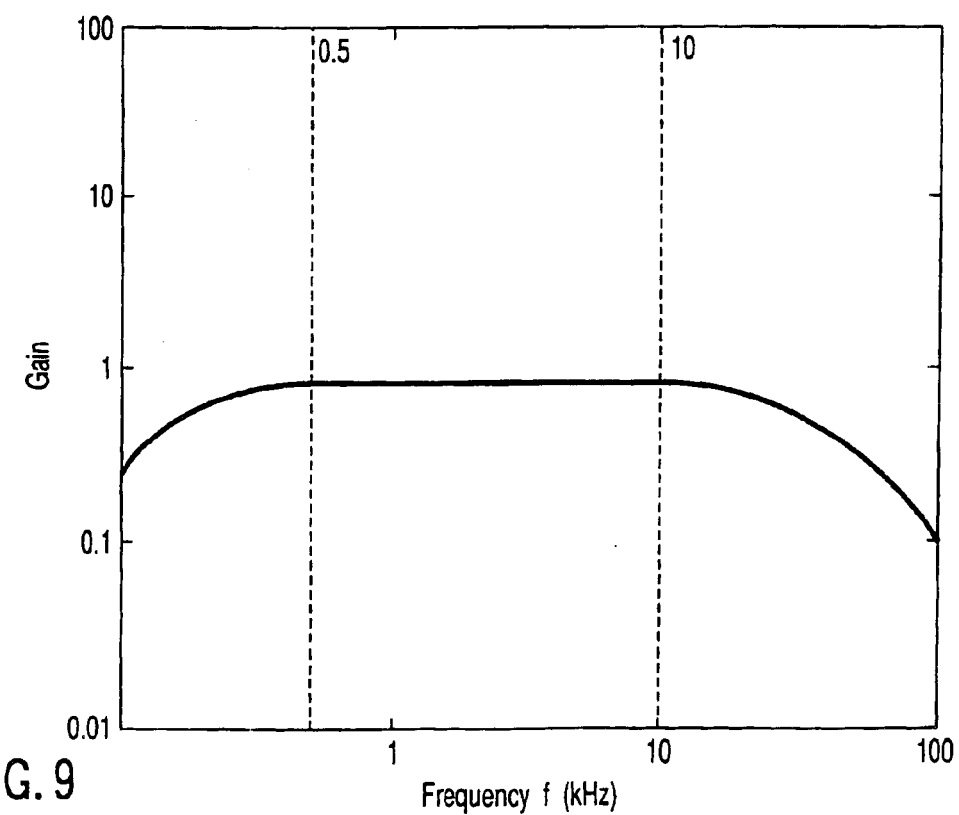
FIG. 9 is a graph illustrating band-pass characteristics of the filter circuit illustrated in FIG. 6.

Thus, in the detection system provided with the contact sensor 11 of the high-sensitivity type (S V/μm=1 V/μm), it is good enough that the band-pass filter (BPF) has the characteristics which allow transmission of the variable detection signal in a time interval of r/S ms to 20r/S ms, e.g., 0.1 ms to 2 ms suppress any other signal corresponding to noise. That is, it is good enough that the band-pass filter (BPF) has the characteristics which can allow transmission of the detection signal in a frequency band of S/20r Hz to S/r Hz, e.g., 500 Hz to 10 kHz and reduce any other signal. Such band-pass filter characteristics are as shown in FIG. 9. The band-pass filter having such characteristics shown in FIG. 9 can be easily configured by a primary low-pass filter and a primary high-pass filter.

In the detection system provided with the contact sensor 11 of the low-sensitivity type (S V/μm=0.1 V/μm), it is good enough that the band-pass filter (BPF) has the characteristics which can allow transmission of the variable detection signal in a time interval of r/S ms to 20r/S ms, e.g., 1 ms to 20 ms and suppress any other signal corresponding to noise. That is, it is good enough that the band-pass filter (BPF) can allow transmission of the detection signal in a frequency band of S/20r Hz to S/r Hz, e.g., 50 Hz to 1 kHz, and reduce any other signal.

Thus, taking account of the contact sensors of various sensitivity types (S V/μm=0.1 to 1 V/μm), it is good enough that the band-pass filter (BPF) has the characteristics which can allow transmission of the variable detection signal in a time interval of r/S ms to 20r/S ms, e.g., 0.1 ms to 20 ms and suppress any other signal corresponding to noise. That is, it is good enough that the band-pass filter (BPF) can allow transmission of the detection signal in a frequency band of S/20r Hz to S/r Hz, e.g., 50 Hz to 10 kHz and reduce any other signal.

The filter circuit 12D shown in FIG. 6 may have a circuit configuration such as shown in FIG. 10. This filter circuit 12D includes five filters 12D1 to 12D5 which respectively correspond to the five objective lenses 6 in order to accurately and rapidly detect the contact signal. The five filters 12D1 to 12D5 have different filter characteristics, for example, different differential filter characteristics. This filter circuit 12D includes a switch 12G provided with switching contacts G1 to G5. When the objective lens 6 is switched and the objective lens 6 is selected, one of the switching contacts G1 to G5 is switched on depending on a selected objective lens 6. The objective lenses and the filters 12D1 to 12D5 have the following correspondence:

5-powered objective lens: first filter 12D1
10-powered objective lens: second filter 12D2
20-powered objective lens: third filter 12D3
50-powered objective lens: fourth filter 12D4
100-powered objective lens: fifth filter 12D5

Description will be given as to the characteristics of the first to fifth filters 12D1 to 12D5.

As already described above, if an output from the detection circuit 12A, which corresponds to the sensitivity of the contact sensor 11 is S V/μm (for example, 1 V/μm), the moving speed of the stage with respect to the objective lens 6 is set as shown in Table (1).

Further, the output from the detection circuit 12A, which corresponds to the sensitivity of the contact sensor 11, has the relationship shown in Table (2) in accordance with each objective lens. Furthermore, elapse of time of the sensor after start of contact and the output (voltage) from the detection circuit 12A, which corresponds to the sensitivity of the sensor 11 provided at each objective lens 6, have the relationship shown in FIG. 8. Moreover, the time period r/S ms (for example, 0.1 ms) required for the output from the detection circuit 12A with respect to the objective lens to reach the threshold value rV (for example, 0.1 V) has the relationship shown in Table (3).

Figure 11:
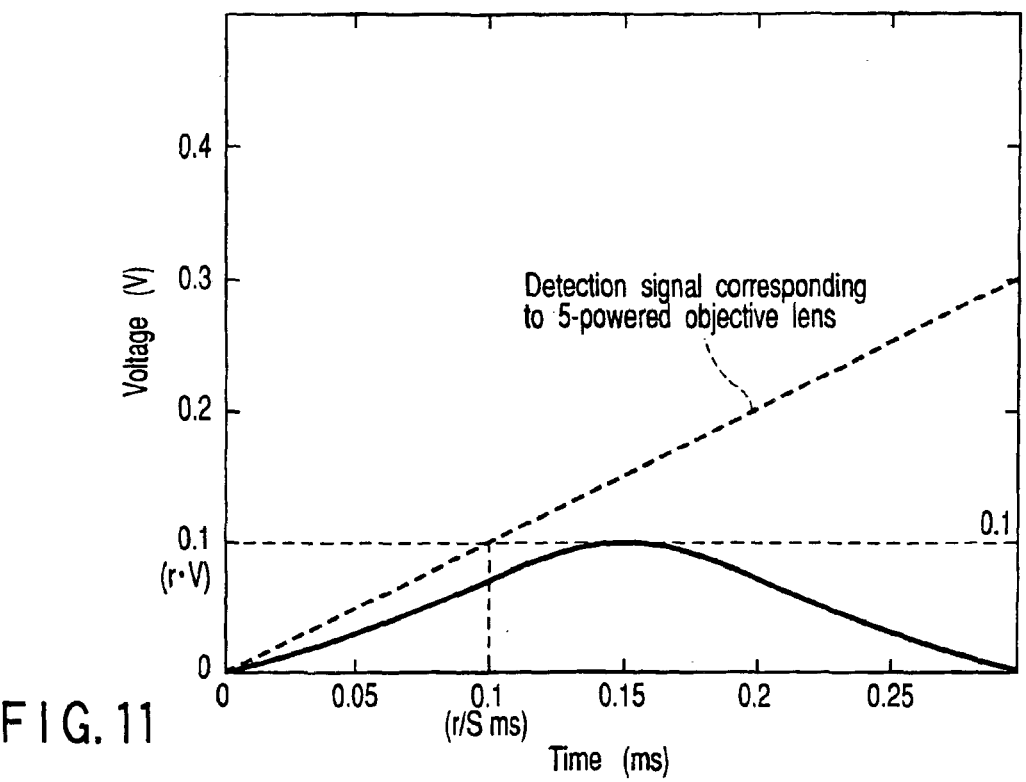
FIG. 11 is a waveform chart showing an output signal of a detection circuit 12A corresponding to a five-powered objective lens in the filter circuit illustrated in FIG. 10 and a sinusoidal signal which approximates a part of a linear signal until a point in time r/S ms at which a threshold value rV is reached.

Here, consideration will be given by substituting the contact output signal (which will be simply referred to as a linear signal hereinafter) shown in FIG. 8 by a sinusoidal signal for the purpose of simplicity. FIG. 11 shows an output signal (linear signal) from the detection circuit 12A corresponding to the five-powered objective lens and a sinusoidal signal which approximates a part of the linear signal until the point in time period r/S ms (for example, 0.1 ms) to reach the threshold value rV (for example, 0.1 V). An amplitude of the sinusoidal signal is set to a half of the threshold value, i.e., r/2 V (for example, 0.05 V), an offset of the same is set to r/20 V, e.g., 0.05 V, and an inverse number of the frequency is approximately threefold of the time required for the linear signal to reach the threshold value rV (for example, 0.1 V) (for example, the frequency is 3.3 kHz).

Incidentally, in this substitution, although a difference is produced in time period to reach the threshold value rV (for example, 0.1 V), this difference can not be a problem as will be described later.

Similarly, when the output signal concerning any other objective lens is substituted by a sinusoidal wave, a frequency of the sinusoidal signal substituted in connection with each objective lens has such a relationship as shown in the following Table (4).

TABLE 4

| Power of objective lens | Frequency of sinusoidal signal | Example of frequency of sinusoidal signal |
| --- | --- | --- |
| 5 power | S/3r kHz | 3.3 kHz |
| 10 power | S/3(2r) kHz | 1.65 kHz |
| 20 power | S/3(4r) kHz | 0.825 kHz |
| 50 power | S/3(10r) kHz | 0.33 kHZ |
| 100 power | S/3(20r) kHz | 0.165 kHz |

Similarly, giving examination on the low-sensor-sensitivity type S V/μm (for example, 0.1 V/μm), the frequency of the sinusoidal signal has such a relationship as shown in the following Table (5).

TABLE 5

| Power of objective lens | Frequency of sinusoidal signal | Example of frequency of sinusoidal signal |
| --- | --- | --- |
| 5 power | S/3r kHz | 0.33 kHz |
| 10 power | S/3(2r) kHz | 0.165 kHz |
| 20 power | S/3(4r) kHz | 0.0825 kHz |
| 50 power | S/3(10r) kHz | 0.033 kHz |
| 100 power | S/3(20r) kHz | 0.0165 kHz |

Figure 12:
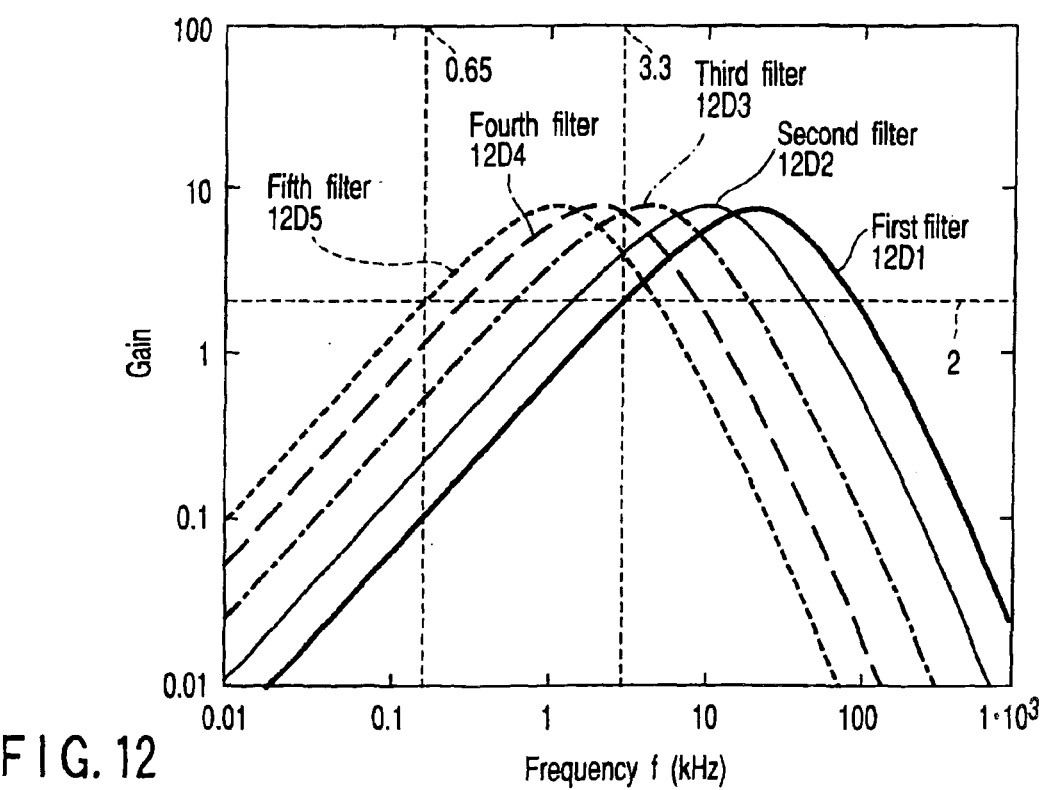
FIG. 12 is a graph showing the relationship between a gain and a frequency of each filter in the filter circuit shown in FIG. 10.

Based on the above examination, the respective filters 12D1 to 12D5 can be constituted by differentiators which detect each sinusoidal signal at a higher speed and secondary low-pass filters which further reduce the noise. Specifically, as shown in FIG. 12, it is preferable that the first filter 12D1 corresponding to the five-powered objective lens 6 has the characteristics including the differential characteristics of the gain×2 with respect to the sinusoidal wave having a frequency of S/3r kHz (for example, 0.33 kHz to 3.3 kHz) and the secondary low-pass filter characteristics that the cutoff frequency is tenfold of the frequency of the sinusoidal wave (for example, 3.3 kHz to 33 kHz). It is preferable that the second filter 12D2 corresponding to the 10-powered objective lens 6 has the characteristics including the differential characteristics of the gain×2 with respect to the sinusoidal wave having a frequency of S/3(2r) kHz (for example, 0.16 kHz to 1.65 kHz) and the secondary low-pass filter characteristics that the cutoff frequency is tenfold of the frequency of the sinusoidal wave (for example, 1.65 kHz to 16.5 kHz). Further, it is preferable that the third filter 12D3 corresponding to the 20-powered objective lens 6 has the characteristics including the differential characteristics of the gain×2 with respect to the sinusoidal wave having a frequency of S/3(4r) kHz (for example, 0.0825 kHz to 0.825 kHz) and the secondary low-pass filter characteristics that the cutoff frequency is tenfold of the frequency of the sinusoidal wave (for example, 0.825 kHz to 8.25 kHz). It is preferable that the fourth filter 12D4 corresponding to the 50-powered objective lens 6 has the characteristics including the differential characteristics of the gain×2 with respect to the sinusoidal wave having a frequency S/3(10r) kHz (for example, 0.033 kHz to 0.33 kHz) and the secondary low-pass filter characteristics that the cutoff frequency is tenfold of the frequency of the sinusoidal wave (for example, 0.33 kHz to 3.3 kHz). Furthermore, it is preferable that the fifth filter 12D5 corresponding to the 100-powered objective lens 6 has the characteristics including the differential characteristics of the gain×2 with respect to the sinusoidal wave having a frequency S/3(20r) kHz (for example, 0.0165 kHz to 0.165 kHz) and the secondary low-pass filter characteristics that the cutoff frequency is tenfold of the frequency of the sinusoidal wave (for example, 0.165 kHz to 1.65 kHz).

Figure 13:
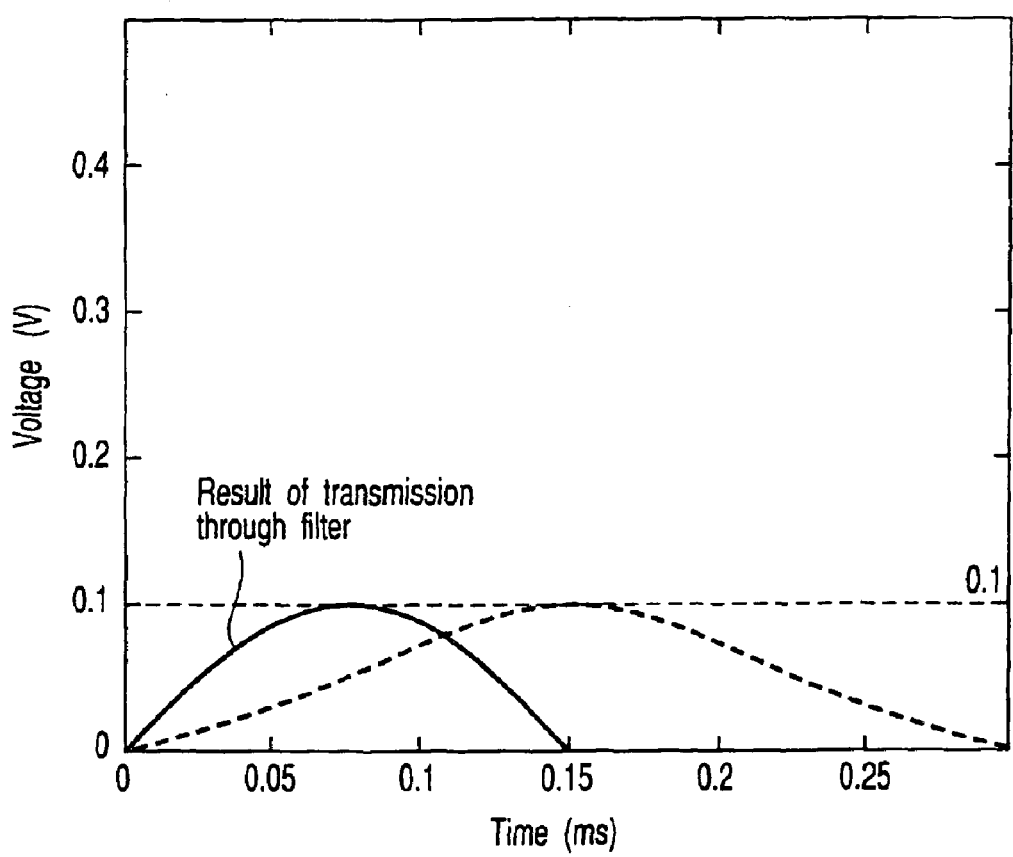
FIG. 13 shows a sinusoidal signal which substitutes for the linear signal of a sensor corresponding to the five-powered objective lens in the filter circuit illustrated in FIG. 10 and is indicated by a broken line and a signal waveform obtained when the sinusoidal signal is transmitted through and outputted from a first filter.

FIG. 13 shows a sinusoidal signal which substitutes for the linear signal of the sensor corresponding to the five-powered objective lens 6 and is indicated by a broken line and a signal waveform (indicated by a solid line) outputted when the sinusoidal signal is transmitted through the first filter 12D1. As shown in FIG. 13, the amplitude of the signal waveform which has transmitted through the first filter 12D1 is equal to the threshold value (for example, 0.1 V) and does not include the offset. The frequency of this signal waveform is the same as that of the original sinusoidal signal. Incidentally, since the output signal waveform shown in FIG. 13 has passed through the differentiator in the first filter, a direct-current (DC) component is eliminated from this output signal waveform, and the phase of the output signal is shifted by π/2 ahead.

Here, description will be briefly given as to the reason why the differential characteristics of the respective filters 12D1 to 12D5 are the gain×2 with respect to the frequency of the sinusoidal signal. Although the amplitude of the substitute sinusoidal signal is a half of the threshold value, that is because the amplitude of the output signal outputted from the filter is set equal to the threshold value. That is, in the filter, the offset which is a half of the threshold value is added to the substitute sinusoidal signal. Incidentally, although the similar advantage can be demonstrated if the gain is not less than×2, it is preferable to set the gain within approximately×10 since the noise of the frequency component corresponding to 0.5 to 100-fold of the frequency of the sinusoidal signal is similarly amplified.

Moreover, the cutoff frequency of the secondary low-pass filter used for reducing the noise is set to tenfold of the frequency of the sinusoidal signal in order to completely obtain the differential characteristics in the vicinity of the frequency of the sinusoidal signal (frequency domain which is 0.1 to 10-fold), namely, avoid the influence of the characteristics of the secondary low-pass filter on the sinusoidal signal.

In addition, in regard to the deviation of time required for the linear signal and the sinusoidal signal to reach the threshold value, since the differentiator substantially completely operates in the vicinity of the frequency of the sinusoidal signal (frequency domain which is 0.1 to 10-fold), slight approximate deviation does not have an influence.

As described above, each sinusoidal signal is subjected to differential processing by each of the filters 12D1 to 12D5, thereby detecting contact at a high speed. Additionally, since the secondary low-pass filter of each filter can reduce the noise of the sinusoidal signal, and contact can be hence further accurately detected.

Incidentally, in the microscope system according to the first to third embodiments, although the pressure sensor or the contact sensor 11 is provided at the end part of the objective lens 6, it may be provided on the stage 2 instead of the end part of the objective lens. When the pressure sensor or the contact sensor 11 is provided on the stage 2, a ring-like pressure sensor or contact sensor 11 is arranged in a frame body 40, a transparent support plate 42 or a support plate 42 which has a transmission hole for illumination light rays is mounted on the pressure sensor or the contact sensor 11, and a sample is mounted on the support plate 42 and observed by the objective lens 6.

In the transmission light source system, the sample 4 is irradiated with light rays through a transmission hole provided on the stage 2 and the support plate 42 or the light ray transmission hole of the support plate.

Figure 14:
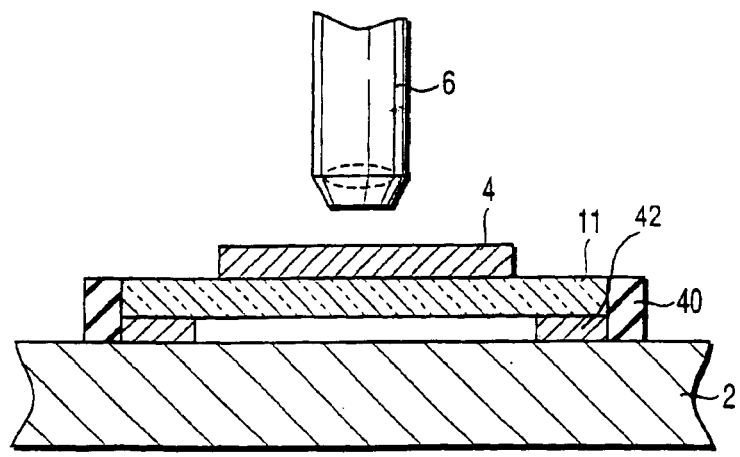
FIG. 14 is a cross-sectional view schematically showing a sensor mechanism according to a modified embodiment of the microscope system shown in FIG. 1.

In the microscope system shown in FIG. 14, when the objective lens 6 of the microscope comes into contact with the sample 4, the slight pressure produced by this contact is transmitted to the ring-like pressure sensor or the contact sensor 11. Therefore, the pressure sensor or the contact sensor 11 outputs a detection signal in response to the contact. Processing of this output signal is similar to that explained in connection with FIGS. 1 to 13, thereby omitting description thereof.

(Fourth Embodiment)

Figure 15A:
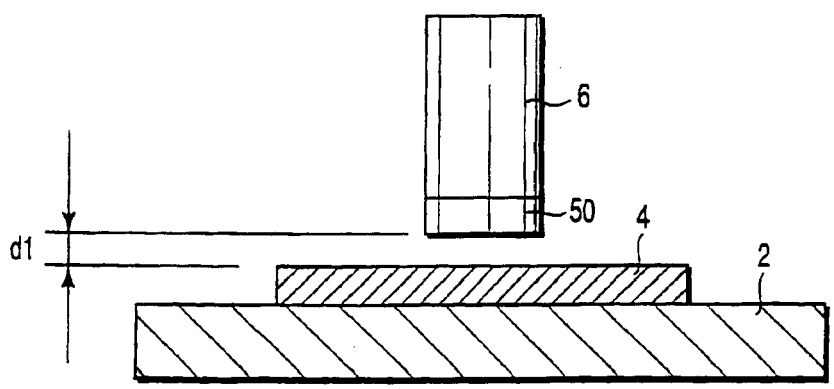
FIGS. 15A and 15B are cross-sectional views schematically showing a sensor mechanism according to a fourth embodiment of the present invention.
Figure 15B:
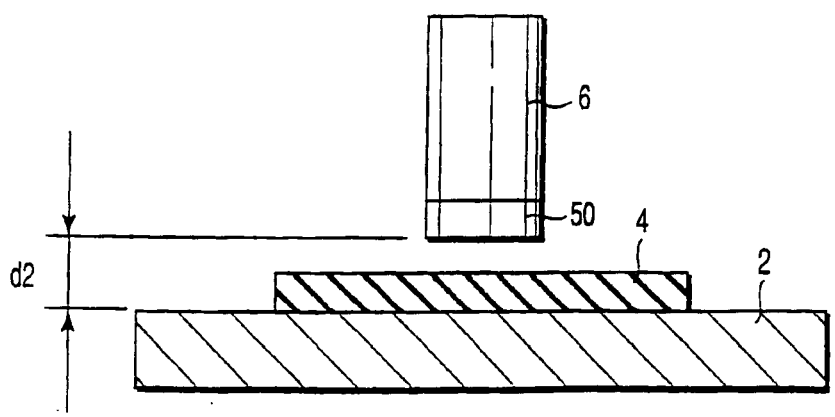

A microscope system according to a fourth embodiment of the present invention will now be described with reference to FIGS. 15A to 15B. In the microscope system according to the fourth embodiment, the possibility of excessive contact between the objective lens 6 and the sample 4 can be detected in the non-contact state in which the sample 4 and the sensor 11 are not in contact with each other. In this microscope system, an electrical capacitance type sensor 50 is adopted as the non-contact sensor.

The electrical capacitance sensor 50 is attached at the end part of the objective lens 6 as similar to the contact sensor 11. In the electrical capacitance sensor 50, if the sample 4 is a conductor, a voltage is outputted in accordance with a distance d1 between the electrical capacitance sensor 50 and the sample 4 as shown in FIG. 15A. Additionally, in the electrical capacitance sensor 50, if the sample 4 is not a conductor, a voltage is outputted in accordance with a distance d2 between the electrical capacitance sensor 50 and the stage 2 as shown in FIG. 15B.

In the microscope system adopting the electrical capacitance sensor 50, since its structure including the circuit configuration of the contact judgment section 12 is similar to that of the microscope system according to the first embodiment, thereby omitting description of the structure of this microscope system. As to the detail of the microscope system adopting the electrical capacitance type sensor 50, see description on FIGS. 1 and 2. In the following, description will be given provided that the electrostatic type sensor 50 is connected to the amplifier 12A in place of the contact sensor 11 in FIGS. 1 and 2.

As shown in FIG. 2, an output from the electrical capacitance sensor 50 is inputted to the amplifier 12A and amplified. The amplified sensor signal is inputted to one input terminal of the comparator 12B which compares one input voltage with the other input voltage so that an output voltage is determined based on a comparison result of the two inputs. Digital data outputted from the CPU 12 as a threshold voltage is converted into analog data through the DA converter 12C and inputted to the other end of the comparator 12B. The comparator 12B compares the default threshold voltage outputted from the CPU 12 with the output voltage from the electrical capacitance sensor 50. In the comparator 12B, when the output voltage from the electrical capacitance sensor 50 is lower than the threshold voltage, it is detected that the objective lens 4 and the sample 2 are contiguous to each other beyond a predetermined range, and the detection signal is supplied to the CPU 12 and the stage control section 9. The CPU 12 and the stage control section 9 execute a predetermined operation for preventing the excessive contact in response to this detection signal.

Figure 16A:
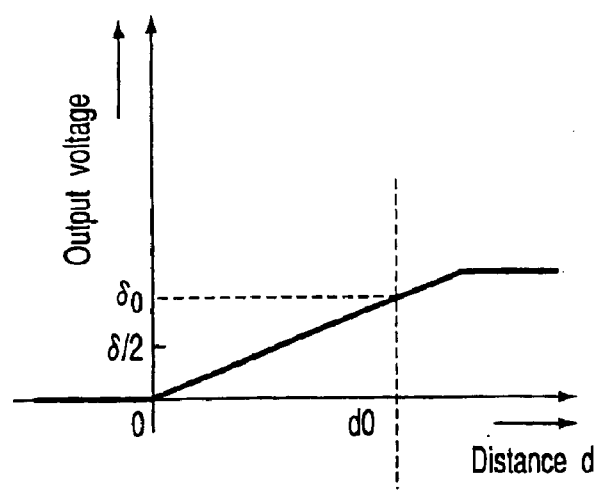
FIGS. 16A, 16B and 16C are graphs showing output signals from electrical capacitance sensors illustrated in FIGS. 15A and 15B.
Figure 16B:
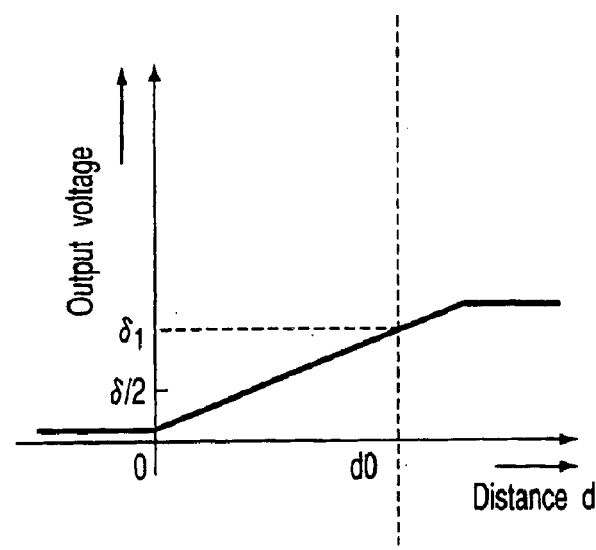
Figure 16C:
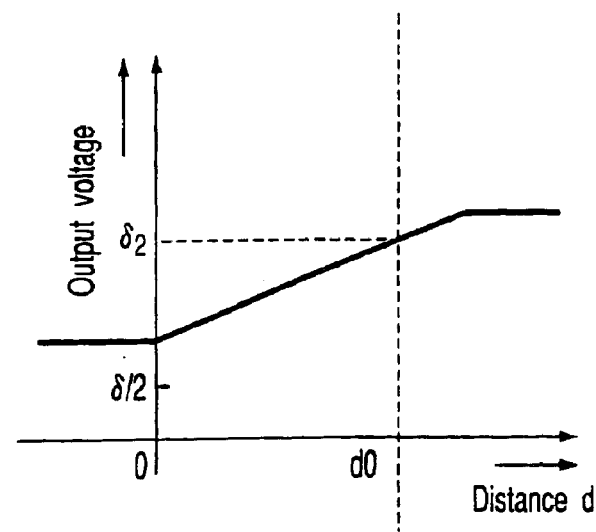

FIGS. 16A to 16C show output signals from the electrical capacitance sensor. FIG. 16A shows ideal output characteristics when the sample 4 is a conductor. In FIG. 16A, when the objective lens 6 having the electrical capacitance sensor 50 attached thereto is in contact with the sample 4, namely, when a gap d1 between the objective lens 6 and the sample 4 is zero (d1=0), the electrical capacitance between the objective lens 6 and the sample 4 is zero, and both the objective lens 6 and the sample 4 are substantially conductive. Therefore, the output voltage from the electrical capacitance sensor 50 is 0. On the contrary, when the distance d1 between the objective lens 6 and the sample 4 increases, the output from the electrical capacitance sensor 50 becomes higher.

Further, a distance d0 indicated by a broken line in FIGS. 16A to 16C represents W D which is a distance between the objective lens 6 and the sample 4 when the objective lens 6 is focusing on the sample 4, and an output from the electrical capacitance sensor 50 at that moment is represented as δ0.

Here, the threshold value γ is set to a given value, e.g., δ0/2 while taking the gradient of the sample itself 4 or warpage of the sample 4 when it is a wafer or the like into consideration. The threshold value γ corresponds to a distance within which the objective lens 6 and the sample 4 are not allowed to be furthermore approached each other. If this threshold value is set to δ0/2, the distance between the objective lens 6 and the sample 4 does not become equal to or less than d1 as shown in FIG. 16A, and the objective lens 6 and the sample 4 are prevented from coming into contact with each other.

Figure 3C:
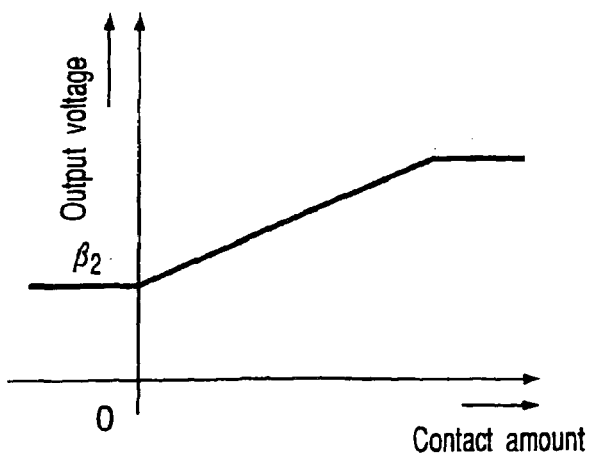

As described with reference to FIGS. 3B and 3C, however, the output voltage is fluctuated as shown in FIG. 16B or 16C in the sensor 50 or its processing circuit. In FIG. 16B or 16C, when the offset of the output increases in the state that the threshold value γ is fixed to δ0/2, the output from the sensor 50 may not reach the threshold value γ sometimes even if the distance between the objective lens 6 and the sample 4 becomes equal to or less than d0. In the worst case, as shown in FIG. 16C, when the output from the sensor 50 has reached the threshold value γ, there is the possibility of excessive contact between the objective lens 6 and the sample 4. It is to be noted that FIGS. 16B and 16C show outputs 61 and 62 (δ1, δ2>δ0) from the electrical capacitance sensor 50 when the distance between the objective lens 6 and the sample 4 has reached d1.

Figure 17:
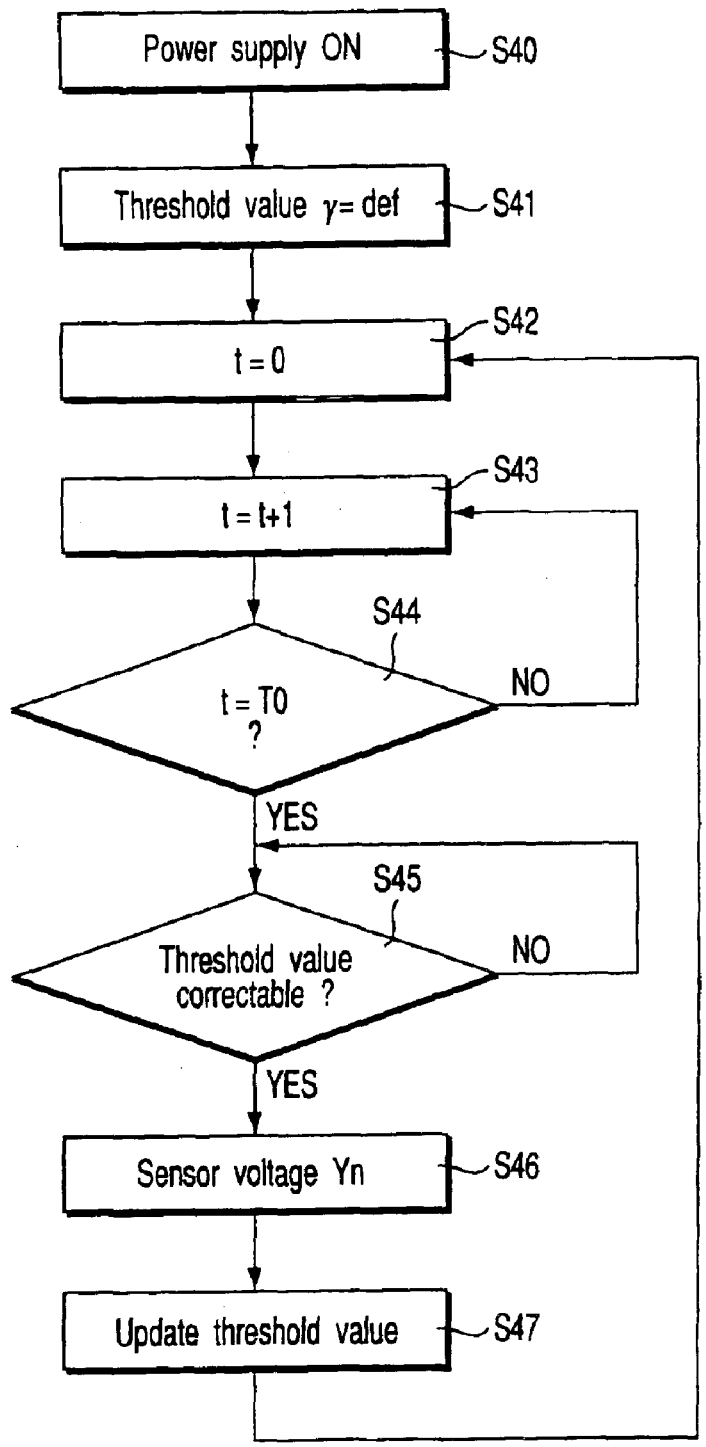
FIG. 17 is a flowchart for illustrating the operation of setting a threshold value for the contact judgment in the microscope system utilizing the sensor mechanism shown in FIGS. 15A and 15B.

Therefore, in this microscope system according to the fourth embodiment of the present invention, as shown in FIG. 17, the detection judgment threshold value γ is periodically updated, and the output from the electrical capacitance sensor 50 is judged by the comparator 12B based on the detection judgment threshold value γ that the offset is canceled. Description will now be given as to updating of the detection judgment threshold value γ with reference to FIG. 17.

As shown in FIG. 17, when the power supply is turned on (step S40), the threshold voltage γ is set to a predetermined γdef (step S41).

Here, the predetermined value γdef is determined by giving a predetermined margin from the voltage calculated by, e.g., the following method.

(1) The voltage is calculated from a thickness or conductivity of the sample 4.

(2) The objective lens is temporarily caused to focus on the sample by the manual operation by a user, and the voltage is calculated based on the electrical capacitance sensor output at that moment.

(3) Values obtained by the methods such as (1) and (2) mentioned above are used to construct a data base, and any set of data is specified.

After the step S41, the time t is initialized to 0 (step S42), and then judgment is repeatedly made upon whether the time t has reached the predetermined time T0 corresponding to the correction timing based on elapse of the time t (steps S43 and S44). Here, confirmation is made upon whether the threshold value can be corrected when the possibility of contact between the sample 4 and the objective lens 6 is lowest every time the time t reaches the predetermined time T0 (step S45). Here, the state that the threshold voltage can be corrected corresponds to the state that the auto-focusing system is determined as in-focus.

When it is determined that the threshold value can be corrected, the CPU 12 detects the output voltage Yn of the electrical capacitance sensor (step S46), and the threshold voltage γn is updated. (Step S47) Then, the processing returns to the step S42.

As described above, according to the microscope system of the fourth embodiment of the present invention, since contiguity between the objective lens and the sample is accurately detected, it is possible to assuredly avoid excessive contact between the objective lens 6 and the sample 4.

Incidentally, in the microscope system according to the first to fourth embodiments mentioned above, the mechanism for moving up or down the stage is described, it is apparent that the present invention can be applied to a mechanism for moving up or down the objective lens. Further, in the foregoing embodiments, the contact sensor 11 for detecting contact between the objective lens 6 and the sample 4 is provided at the end part of the objective lens. It is, however, apparent that the present invention can be applied to a configuration in which the contact sensor 11 provided in the objective lens or a junction part of to the electric revolver 5 for mounting the objective lens 6 in stead of the above described arrangement.

As described above, according to the present invention, it is possible to provide the microscope system which can eliminate the influence of the drift caused due to a change in environment (change in temperature or humidity) or a change with time and accurately detect contact between the objective lens and the observation object.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope system comprising:
   a stage on which an observation object is mountable;
   an objective lens for observing the observation object, said objective lens being movable in a direction of an optical axis; and
   a stage control section to control a relative movement of the stage and the objective lens, said stage control section comprising:
      a contact sensor provided at an objective lens side to generate a detection signal which depends on a contact amount between the objective lens and the observation object, and which includes one of an initial offset and an updated offset;
      a comparing section configured to compare the detection signal with a threshold value and to generate a contact signal when the detection signal is determined to be greater than the threshold value;
      a controlling mechanism configured to control the relative movement between the stage and the objective lens in response to the contact signal to prevent excessive contact between the observation object and the objective lens;
      an initial setting section configured to set the threshold value as the default threshold value at an initial time, in a setting state in which the observation object and the objective lens are separated from each other, said default threshold value corresponding to a sum of a predetermined pressure amount and the initial offset; and
      an updating section configured to determine whether the setting state is present each time a predetermined time elapses, and if the setting state is present: (i) to maintain the threshold value as the default threshold value when the detection signal corresponds to the initial offset in the setting state, and (ii) to set the threshold value to be an updated threshold value when the detection signal corresponds to the updated offset in the setting state, said updated threshold value corresponding to a sum of the predetermined pressure amount and the updated offset.

2. The microscope system according to claim 1, wherein the contact sensor comprises a pressure sensor which detects a contact pressure between the observation object and the objective lens.

3. A microscope system comprising:
   a stage on which an observation object is mountable;
   an objective lens for observing the observation object, said objective lens being movable in a direction of an optical axis; and
   a stage control section to control a relative movement of the stage and the objective lens, said stage control section comprising:

a contact sensor provided at an objective lens side to generate a detection signal which depends on a contact amount between the objective lens and the observation object, and which includes one of an initial offset and an updated offset;

a comparing section configured to compare the detection signal with a threshold value and to generate a contact signal when the detection signal is determined to be greater than the threshold value;

a controlling mechanism, configured to control the relative movement between the stage and the objective lens in response to the contact signal to prevent excessive contact between the observation object and the objective lens;

an initial setting section configured to set the threshold value as the default threshold value at an initial time, in a setting state in which the observation object and the objective lens are separated from each other, said default threshold value corresponding to a sum of a predetermined pressure amount and the initial offset; and an updating section configured to determine whether the setting state is present each time a predetermined time elapses, and if the setting state is present: (i) to maintain the threshold value as the default threshold value when the detection signal corresponds to the initial offset in the setting state, and (ii) to set the threshold value to be an updated threshold value when the detection signal corresponds to the updated offset in the setting state, said updated threshold value corresponding to a sum of the predetermined pressure amount and the updated offset; and a returning section configured to return the threshold value to the default threshold value when the setting state is determined not to be present for a predetermined period.

4. The microscope system according to claim 3, wherein the contact sensor comprises a pressure sensor which detects a contact pressure between the observation object and the objective lens.

* * * * *